US009864898B2

(12) United States Patent
Hara

(10) Patent No.: US 9,864,898 B2
(45) Date of Patent: Jan. 9, 2018

(54) FEATURE POINT INPUT ASSISTING DEVICE, FEATURE POINT INPUT ASSISTING METHOD, AND STORAGE MEDIUM STORED WITH PROGRAM

(71) Applicant: NEC Corporation, Tokyo (JP)

(72) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 14/827,437

(22) Filed: Aug. 17, 2015

(65) Prior Publication Data
US 2016/0055367 A1 Feb. 25, 2016

(30) Foreign Application Priority Data
Aug. 19, 2014 (JP) .................................. 2014-166655

(51) Int. Cl.
G06K 9/00 (2006.01)
G06K 9/03 (2006.01)
(52) U.S. Cl.
CPC ......... G06K 9/00073 (2013.01); G06K 9/033 (2013.01); G06K 9/036 (2013.01)
(58) Field of Classification Search
None
See application file for complete search history.

(56) References Cited

U.S. PATENT DOCUMENTS

| 5,555,314 A * | 9/1996 | Nakajima | G06K 9/00067 382/124 |
| 5,901,239 A * | 5/1999 | Kamei | G06K 9/00067 382/124 |
| 6,002,785 A * | 12/1999 | Ucida | G06K 9/00087 340/5.83 |
| 6,072,895 A * | 6/2000 | Bolle | G06K 9/00067 382/125 |
| 6,567,765 B1 * | 5/2003 | Wu | G06K 9/00087 702/108 |
| 6,961,452 B2 * | 11/2005 | Fujii | G06K 9/00006 382/125 |

(Continued)

FOREIGN PATENT DOCUMENTS

| JP | 4-306777 | 10/1992 |
| JP | 2002-373334 | 12/2002 |

(Continued)

OTHER PUBLICATIONS

Slap fingerprint segmentation evaluation 2004, pp. 1-3.*

Primary Examiner — Jayesh A Patel
(74) Attorney, Agent, or Firm — Finnegan Henderson, Farabow, Garrett & Dunner, L.L.P.

(57) ABSTRACT

To provide a feature point input assisting device that can carry out the input assistance of the feature point.

A feature point input assisting device includes a processor circuitry. The processor circuitry configured to set a first feature point in an input image including a stripe pattern formed by ridge lines. The processor circuitry configured to extract a second feature point from the input image by using the first feature point. The processor circuitry configured to extract a feature point, which is the second feature point having no corresponding first feature point, as an input omission feature point candidate. The processor circuitry configured to output the input omission feature point candidate to a display device.

14 Claims, 21 Drawing Sheets

(56) References Cited

U.S. PATENT DOCUMENTS

| | | | | |
|---|---|---|---|---|
| 7,127,106 B1* | 10/2006 | Neil | G06K 9/4609 | 382/124 |
| 7,369,688 B2* | 5/2008 | Ser | G06K 9/00067 | 283/68 |
| 7,936,907 B2* | 5/2011 | Maurer | G06K 9/00067 | 340/5.53 |
| 8,041,085 B2* | 10/2011 | Dennard | G06K 9/00093 | 382/125 |
| 8,699,764 B2* | 4/2014 | Vitt | G06K 9/00006 | 382/115 |
| 9,208,392 B2* | 12/2015 | Chandhok | G06K 9/00973 | |
| 2001/0036301 A1* | 11/2001 | Yamaguchi | G06K 9/00067 | 382/125 |
| 2004/0125993 A1* | 7/2004 | Zhao | G06K 9/00006 | 382/124 |
| 2005/0084174 A1* | 4/2005 | Imai | G06T 7/0002 | 382/274 |
| 2006/0159316 A1* | 7/2006 | Chisamore | G06K 9/00073 | 382/125 |
| 2007/0183636 A1* | 8/2007 | Cardonnel | G07C 9/00087 | 382/125 |
| 2008/0080752 A1* | 4/2008 | Rahmes | G06K 9/00026 | 382/124 |
| 2009/0196467 A1* | 8/2009 | Okubo | G06K 9/00288 | 382/118 |
| 2010/0135538 A1* | 6/2010 | Barral | G06K 9/6211 | 382/115 |
| 2011/0200237 A1* | 8/2011 | Nakamura | A61B 5/1171 | 382/127 |
| 2012/0014570 A1* | 1/2012 | Abe | G06K 9/036 | 382/124 |
| 2015/0178547 A1* | 6/2015 | Bahjat | G06K 9/00617 | 382/117 |
| 2015/0286855 A1* | 10/2015 | Neskovic | G06K 9/00073 | 382/125 |
| 2016/0034744 A1* | 2/2016 | Chiang | G06K 9/00073 | 382/125 |

FOREIGN PATENT DOCUMENTS

| | | |
|---|---|---|
| JP | 2007-65900 | 3/2007 |
| WO | WO 2011/089813 A1 | 7/2011 |

\* cited by examiner

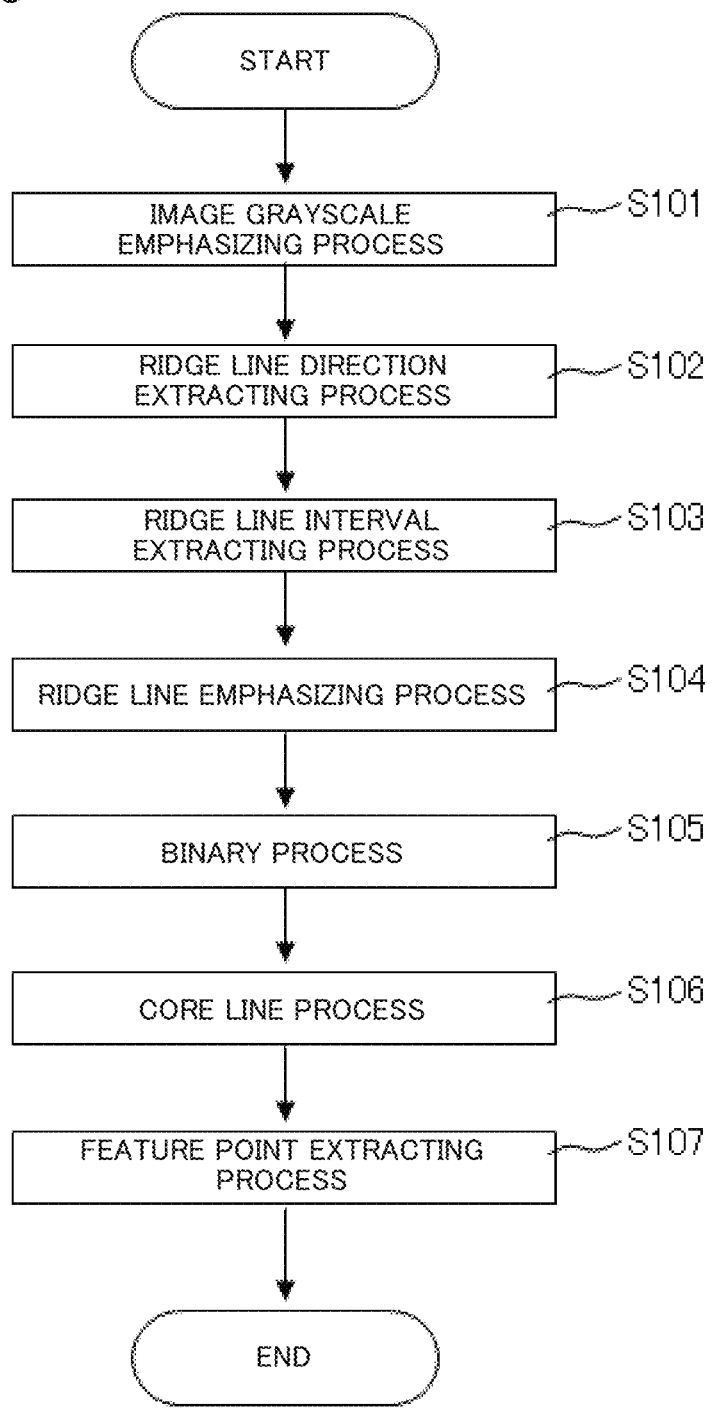

FEATURE POINT INPUT ASSISTING DEVICE, FEATURE POINT INPUT ASSISTING METHOD, AND STORAGE MEDIUM STORED WITH PROGRAM

This application is based upon and claims the benefit of priority from Japanese Patent Application No. 2014-166655, filed on Aug. 19, 2014, the disclosure of which is incorporated herein in its entirety by reference.

TECHNICAL FIELD

The present invention relates to a feature point input assisting device, a feature point input assisting method, and a storage medium stored with a program.

BACKGROUND ART

Fingerprints and palm prints formed by numerous ridge lines in a curved stripe pattern have been used as a means for verifying a person for a long time. In particular, a matching that uses a latent print remaining in a crime scene, and the like is an effective investigation means. In many police agencies, a fingerprint matching system using a computer is installed. Respective feature points (also referred to as Minutiae) of a fingerprint image registered in a database and the latent print collected at the crime scene, and the like are compared to specify a person corresponding to the latent print. End points and bifurcations of the fingerprint ridge line (fingerprint minutiae) are often used as the feature point used in the fingerprint matching.

However, the quality of the fingerprint image for the latent print is low, and usually contains a great amount of noise. Thus, automatic extraction of the feature point using the computer has limits. The feature point calculated by the computer is often not used thoroughly even in the police agency installed with the fingerprint matching system. In this case, an examiner with specialized knowledge often carries out the operation of manually (by hand) inputting the feature point (end point, bifurcation) to an image for the latent print. Alternatively, the examiner may add or delete a feature point with respect to the fingerprint image, on which the feature point automatically extracted by the computer is reflected, to set the feature point. The addition of the new feature point and the deletion of the feature point by the examiner are referred to as a manual correction input (Minutia edit, Minutia plot) of the feature point.

Patent Literatures 1 to 4 disclose a technique for accurately extracting a feature point from a fingerprint image and a technique for reducing the task necessary for the input task of the feature point, and the like. Specifically, Patent Literature 1 discloses a fingerprint feature extracting device that reduces the task of checking the number of ridge lines and the correction task, which are essential when an editing task of the feature point of an unclear fingerprint, in particular, the latent print is carried out. Patent Literature 2 discloses a ridge line direction extracting device, and the like that can accurately extract the ridge line direction even in a direction unstable region. Patent Literature 3 discloses an image processing device that removes a curved stripe pattern noise from the curved strip pattern image and emphasizes the ridge line of the fingerprint in interest, and the like. Patent Literature 4 discloses a fingerprint feature correction system that assists the correction task of the fingerprint image for the latent print, and the like.

CITATION LIST

Patent Literature

[PTL 1] Japanese Laid-Open Patent Publication No. 2002-373334
[PTL 2] Japanese Laid-Open Patent Publication No. 2007-065900
[PTL 3] International Laid-Open Patent No. 2011/089813
[PTL 4] Japanese Laid-Open Patent Publication No. 04-306777

SUMMARY

Each disclosure of the citation list is incorporated herein by reference. The following analysis is made by the inventors of the present invention.

As described above, in the fingerprint matching system targeted to the finger image such as the latent print with a great amount of noise, a manual correction input of the feature point by the examiner is carried out. The feature point of the fingerprint image of the latent print plays an important role when calculating a feature quantity that characterizes the fingerprint image. Thus, if the manual correction input of the feature point is omitted by the examiner, a fingerprint image of a person different from the person corresponding to the latent image may be calculated as a result of the fingerprint matching. That is, the input omission of the feature point when the examiner carries out the manual correction input of the feature point causes the degradation of the matching accuracy.

Therefore, although it is preferable that the manual correction input of the feature point does not have input omission, but it is difficult to completely prevent the input omission of the feature point even if one examiner carefully carries out the manual correction input of the feature point. A plurality of examiners may double check to eliminate the input omission of the feature point, but such double checking leads to increase in the load of the examiner.

It is an object of the present invention to provide a feature point input assisting device, a feature point input assisting method, and a storage medium stored with a program that can carry out the input assistance of the feature point.

According to a first aspect of the present invention, a feature point input assisting device is provided, the feature point input assisting device including a feature point input unit that sets a first feature point in an input image including a striped pattern formed by ridge lines; a feature point extracting unit that extracts a second feature point including the first feature point from the input image; an input omission candidate extracting unit that extracts a feature point which is the second feature point having no corresponding first feature point, as an input omission feature point candidate; and a feature point output unit that outputs the input omission feature point candidate to a display device.

According to a second aspect of the present invention, a feature point input assisting method is provided, the method including the steps of setting a first feature point in an input image including a stripe pattern formed by ridge lines; extracting a second feature point including the first feature point from the input image; extracting a feature point, which is the second feature point having no corresponding first feature point, as an input omission feature point candidate; and outputting the input omission feature point candidate to a display device.

According to a third aspect of the present invention, a program is provided, the program for causing a computer, which controls a feature point input assisting device, to execute processes of setting a first feature point in an input image including a stripe pattern formed by ridge lines; extracting a second feature point including the first feature point from the input image; extracting a feature point which is the second feature point having no corresponding first feature point, as an input omission feature point candidate; and outputting the input omission feature point candidate to a display device.

The program may be recorded on a computer readable storage medium. The storage medium may be a non-transient medium such as a semiconductor memory, a hard disc, a magnetic recording medium, and an optical recording medium. The present invention can be embodied as a computer program product.

According to the each aspect of the present invention, the feature point input assisting device, the feature point input assisting method, and the storage medium stored with the program that contribute to carrying out the input assistance of the feature point are provided.

BRIEF DESCRIPTION OF THE DRAWINGS

FIG. 9 is a flowchart showing one example of an operation of a feature point extracting unit.

EXEMPLARY EMBODIMENT

Figure 1:
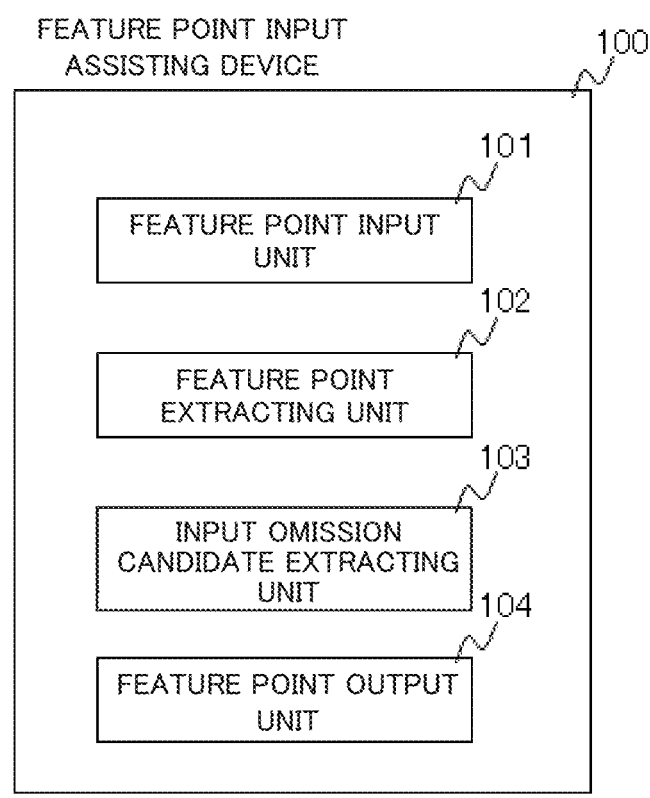
FIG. 1 is a view describing an outline of one exemplary embodiment.

First, an outline of one exemplary embodiment will be described using FIG. 1. The reference numerals of the figures denoted in the outline are denoted to each element for the sake of convenience as an example for facilitating the understanding, and are not intended in any way to limit the description of the outline.

As described above, a feature point input assisting device that carries out an input assistance of a feature point by an examiner is desired.

By way of one example, FIG. 1 shows a feature point input assisting device 100. The feature point input assisting device 100 includes a feature point input unit 101, a feature point extracting unit 102, an input omission candidate extracting unit 103, and a feature point output unit 104. The feature point input unit 101 sets a first feature point in an input image including a striped pattern formed by ridge lines. The feature point extracting unit 102 extracts a second feature point by using the first feature point from the input image. The input omission candidate extracting unit 103 extracts a feature point that is a second feature having no corresponding first feature point as an input omission feature point candidate. The feature point output unit 104 outputs the input omission feature point candidate to a display device.

The feature point input assisting device 100 receives an operation by an examiner to set a feature point (first feature point) on an input image related to a latent print, and the like. Assume that the feature point input by the examiner on the basis of his/her knowledge does not contain errors. Thus, the feature point input assisting device 100 extracts a feature point from the input image by using the feature point (first feature point) input by the examiner, that is, such that a feature point (second feature point) having the same position and the same feature point direction as the first feature point is extracted. Thereafter, the feature point input assisting device 100 compares the position and the feature point direction of the first feature point with those of the second feature point, and extracts the second feature point that has no corresponding first feature point as an input omission feature point candidate. The examiner determines the validity of the input omission feature point candidate presented by the feature point input assisting device 100 through the display device, and adds a feature point, and the like, as necessary.

If the input omission of the feature point is found, the feature point input assisting device 100 notifies the examiner of the possibility of existence of the input omission feature point to get the attention of the examiner. In other words, the feature point input assisting device 100 assists the input of the feature point by the examiner to reduce the load of the examiner carrying out the manual correction input of the feature point.

In the present specification, the end point of the ridge line and the bifurcation of the ridge line are defined as feature points of the fingerprint image. Furthermore, the feature point direction of the feature point is defined as a direction in which the ridge line is formed from the feature point or a direction in which the ridge line branched at the feature point advances.

Specific exemplary embodiments will be described hereinafter in more detail with reference to the drawings.

First Exemplary Embodiment

A first exemplary embodiment will be described using the drawings.

Figure 2:
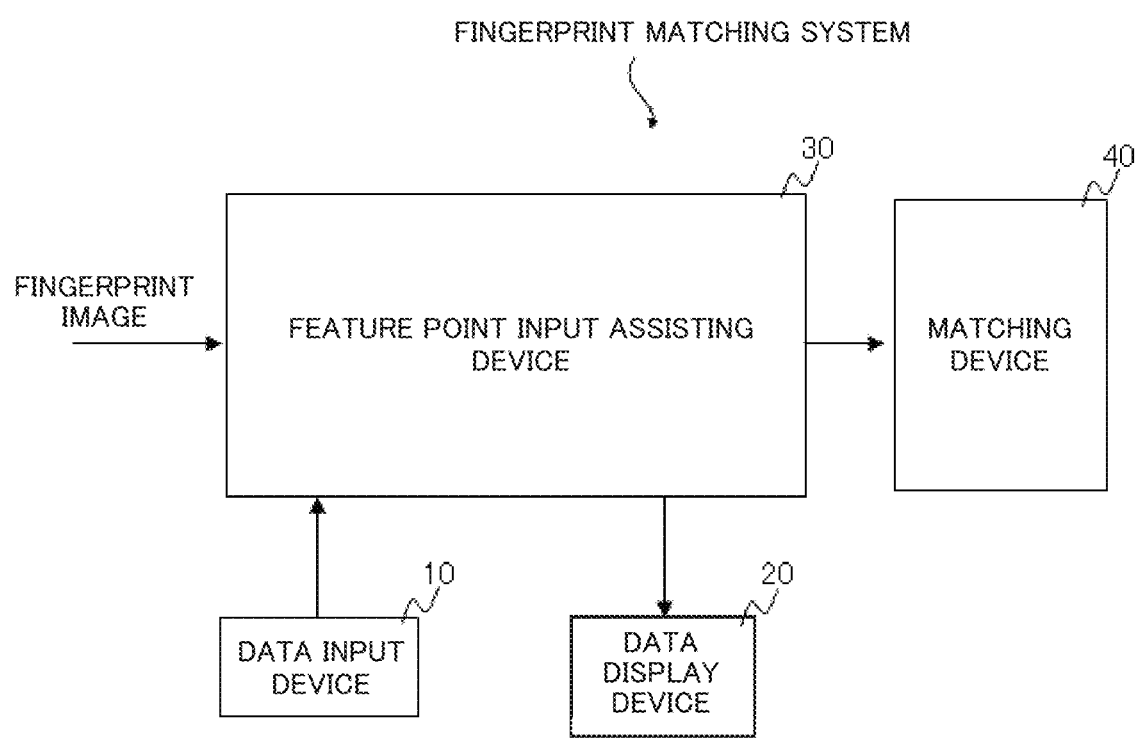
FIG. 2 is a view showing one example of a configuration of a fingerprint matching system according to a first exemplary embodiment.

FIG. 2 is a view showing one example of a configuration of a fingerprint matching system according to the first exemplary embodiment. With reference to FIG. 2, the fingerprint matching system is configured to include a data input device 10, a data display device 20, a feature point input assisting device 30, and a matching device 40.

The data input device 10 is configured to include, for example, a pointing device such as a mouse, and a tablet. The data input device 10 is also a device that receives an operation by the examiner.

The examiner uses the data input device 10 to input information necessary for the feature point input assisting device 30. Though the details will be described later, the examiner uses the data input device 10 to carry out an operation (manual correction input of feature point) of setting a feature point on the fingerprint image.

The data display device 20 is configured to include, for example, a display device such as a liquid crystal display. The data display device 20 displays a fingerprint image, a feature point, assistance data related to the manual correction input, and the like.

The feature point input assisting device 30 is a device that inputs the fingerprint image, and assists the input of the feature point by the examiner to the fingerprint image. For example, the feature point input assisting device 30 inputs an image of a latent print collected from a crime scene, the image being a digitized fingerprint image.

The feature point input assisting device 30 displays the fingerprint image on the data display device 20. The examiner carries out the manual correction input of the feature point on the fingerprint image while viewing the displayed fingerprint image. The feature point input assisting device 30 reflects the manually input feature point on the fingerprint image.

When the examiner finishes the manual correction input of the feature point, the feature point input assisting device 30 verifies the presence/absence of the input omission of the feature point, and presents the verification result to the examiner. The examiner verifies the presented verification result. The examiner then inputs a new feature point when determining that the feature point of input omission exists. When the new feature point is input, the feature point input assisting device 30 verifies the presence/absence of the input omission of the feature point again, and presents the verification result to the examiner.

Such processes are repeated, and when the examiner finally determines that the input omission does not exist, the examiner inputs an instruction to terminate the manual correction input to the feature point input assisting device 30.

The feature point input assisting device 30 that received the instruction outputs the input fingerprint image, and the various types of fingerprint data (e.g., feature point data) generated from the fingerprint image to the matching device 40. The feature point data is data including coordinate data indicating the position of each feature point in the fingerprint image, and direction data indicating the feature point direction of each feature point.

The matching device 40 is a device connected to, for example, the feature point input assisting device 30 via a network (not shown). The matching device 40 is a device that searches for a fingerprint image that matches the fingerprint image, which is acquired from the feature point input assisting device 30, from a plurality of fingerprint images registered in a database (not shown). In this case, the matching device 40 uses the various types of fingerprint data to calculate the feature quantity of the fingerprint image, and extracts a fingerprint image that coincides with or is approximate to the calculated feature quantity. The fingerprint image extracted by the matching device 40 is output to the data display device 20 as the matching result.

Figure 3:
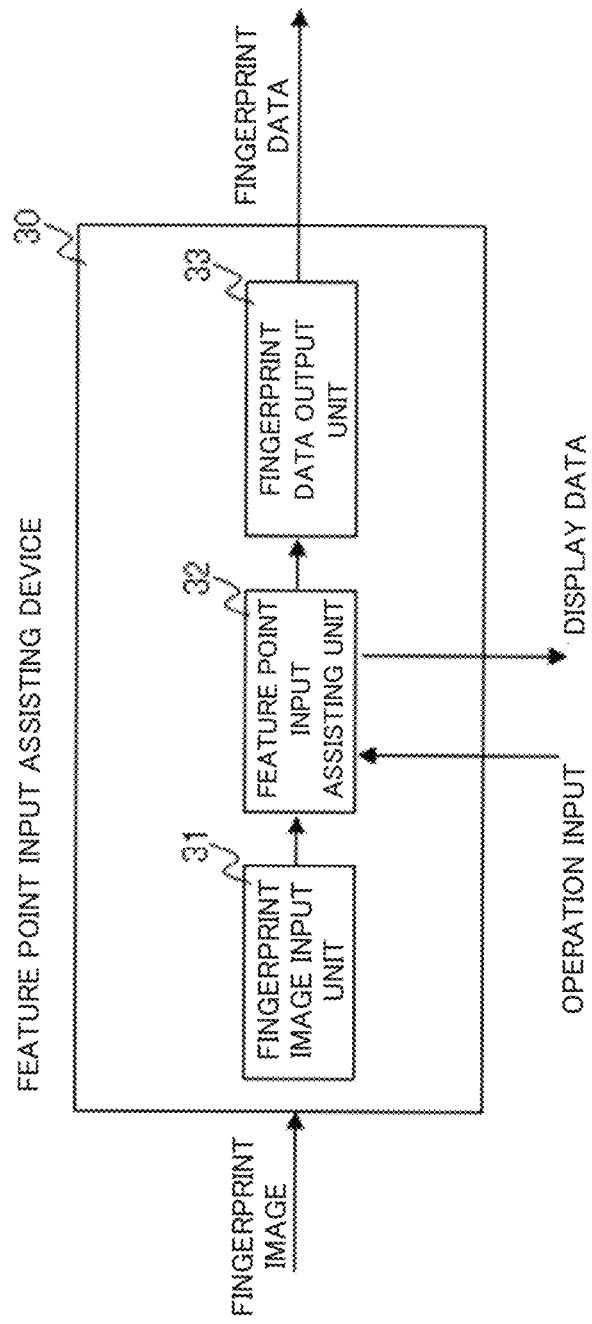
FIG. 3 is a view showing one example of an internal configuration of a feature point input assisting device.

FIG. 3 is a view showing one example of an internal configuration of the feature point input assisting device 30. The feature point input assisting device 30 is configured to include a fingerprint image input unit 31, a feature point input assisting unit 32, and a fingerprint data output unit 33.

The fingerprint image input unit 31 inputs data of the fingerprint image. For example, the fingerprint image input unit 31 retrieves digital data (image file) of the fingerprint image stored in an storage medium such as a USB (Universal Serial Bus) memory, and provides the relevant data to the feature point input assisting unit 32. Alternatively, the fingerprint image input unit 31 may input data of the fingerprint image via the network. The fingerprint image input unit 31 may have a scanner function to acquire the digitized fingerprint image, rather than inputting the digitized fingerprint image with a scanner, and the like.

A standardized standard for a fingerprint image exists. Specifically, ANSI/NIST-ITL-1-2000 Data Format for the Interchange of Fingerprint, Facial, & Scar Mark & Tattoo (SMT) Information, and the like standardized by US National Institute of Standards and Technology is known. It is preferable that the fingerprint image input unit 31 may handle the fingerprint image (e.g., fingerprint image having resolution of 500 dpi) digitized based on the above-described standard.

The feature point input assisting unit 32 verifies the input omission of the feature point in the manual correction input of the feature point, and presents the result to the examiner. In other words, the feature point input assisting unit 32 realizes a feature point correcting function for assisting the input and the correction of the input of the feature point by the examiner. The details of the feature point input assisting unit 32 will be described later.

The fingerprint data output unit 33 outputs the fingerprint data generated by the feature point input assisting unit 32 (e.g., data related to feature point on which input omission check by examiner is completed) to the matching device 40 along with the corresponding fingerprint image. Alternatively, the fingerprint data output unit 33 may write the fingerprint data and the fingerprint image to an external storage medium. That is, the fingerprint data, and the like may be input to the matching device 40 through the storage medium.

The feature point input assisting unit 32 now will be described.

Figure 4:
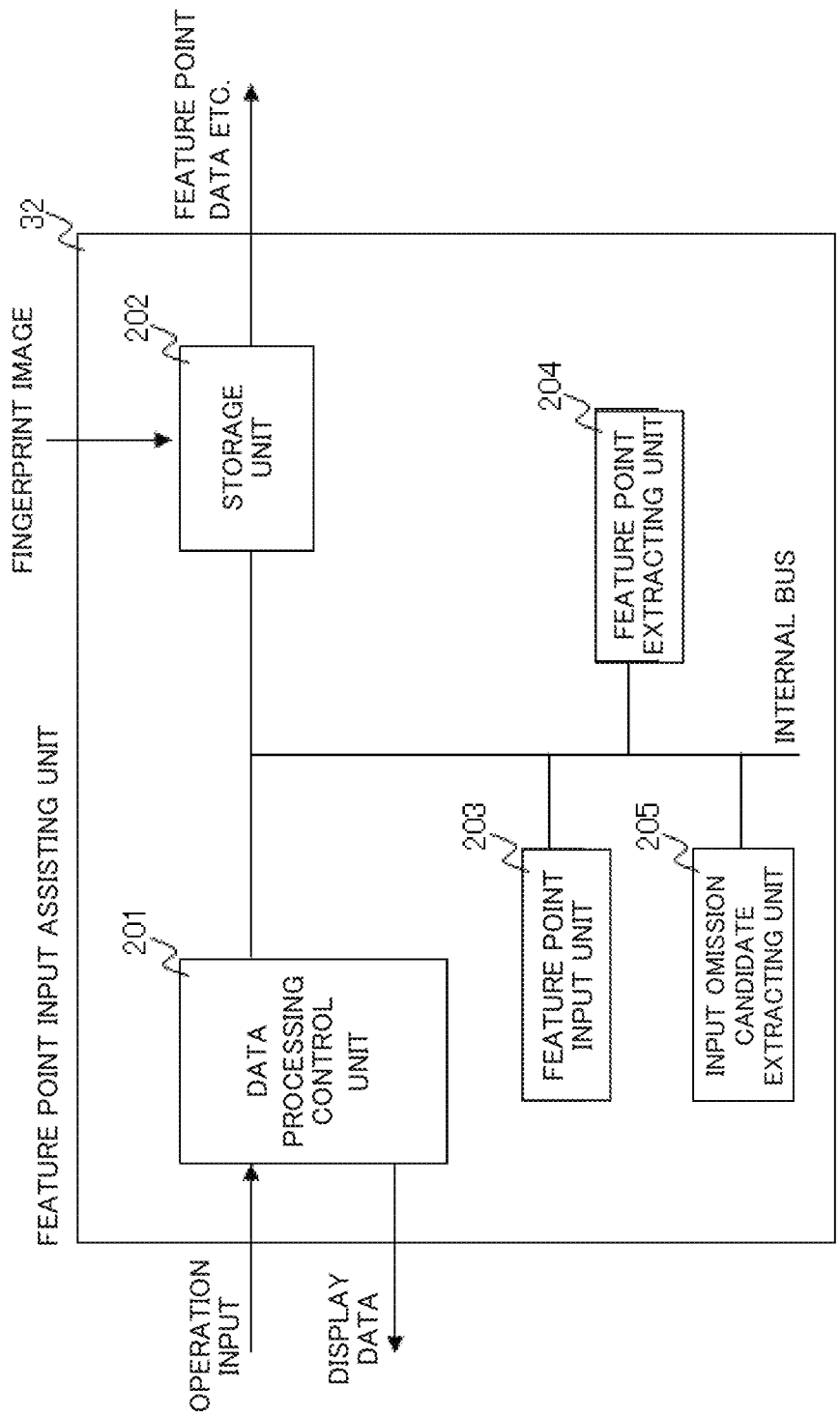
FIG. 4 is a view showing one example of an internal configuration of a feature point input assisting unit.

FIG. 4 is a view showing one example of an internal configuration of the feature point input assisting unit 32. With reference to FIG. 4, the feature point input assisting unit 32 is configured to include a data processing control unit 201, a storage unit 202, a feature point input unit 203, a feature point extracting unit 204, and an input omission candidate extracting unit 205.

The data processing control unit 201 controls the operation of each unit composing the feature point input assisting unit 32. The data processing control unit 201 exchanges data and message with the data input device 10 and the data display device 20. The data processing control unit 201 has the functions of the feature point output unit 104 described above.

The storage unit 202 is a storage device that provides a work region to each unit configuring the feature point input assisting unit 32. The storage unit 202 temporarily stores information generated by each unit. For example, the storage unit 202 comprises a RAM (Random Access Memory). The storage unit 202 stores the fingerprint image output by the fingerprint image input unit 31. The storage unit 202 also stores the feature point data, and the like which is to be output to the fingerprint data output unit 33.

The feature point input unit 203 inputs operations related to the setting of the feature point by the examiner, such as the manual deletion of the feature point, the addition of a new feature point by the examiner. In the following description, the feature point input by the examiner is notated as an input feature point.

The feature point extracting unit 204 uses the input feature point to process the fingerprint image. The feature point extracting unit 204 extracts the feature point from the processed fingerprint image. In this case, the feature point extracting unit 204 extracts the feature point from the fingerprint image so as to include the feature point (input feature point) input by the examiner. In the following description, the feature pint extracted by the feature point extracting unit 204 is notated as an extracted feature point.

The input omission candidate extracting unit 205 extracts a feature point, which is an extracted feature point having no corresponding input feature point, as an input omission feature point candidate. Specifically, the input omission candidate extracting unit 205 compares the input feature point which is output by the feature point input unit 203 (feature point carried out a manual correction input by the examiner) with the extracted feature point which is output by the feature point extracting unit 204 (feature point automatically extracted using the input feature point), and generates a difference thereof. The input omission candidate extracting unit 205 sets the feature point based on generated difference as the input omission candidate in the manual correction input of the feature point by the examiner. The data processing control unit 201 displays the fingerprint image reflecting the feature point which is set as the input omission candidate on the data display device 20.

Figure 5:
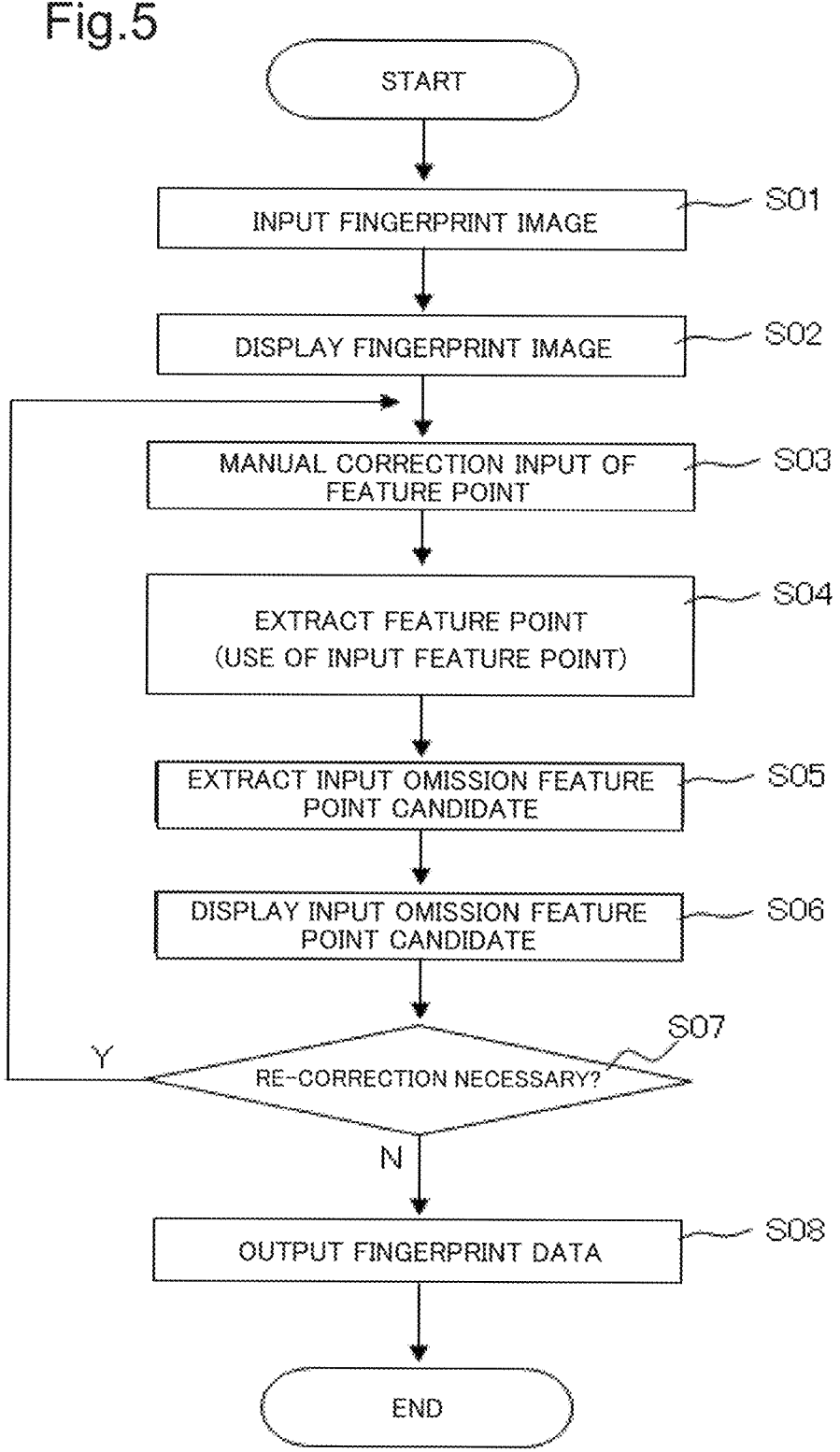
FIG. 5 is a flowchart showing one example of an operation of a feature point input assisting device.

FIG. 5 is a flowchart showing one example of an operation of the feature point input assisting device 30.

In step S01, the fingerprint image input unit 31 inputs the fingerprint image in which a curved stripe pattern is formed by the ridge lines. The fingerprint image input unit 31 inputs, for example, the fingerprint image shown in FIG. 6. The fingerprint image shown in FIG. 6 is an example of a latent print remaining in the crime scene, and is a low quality fingerprint image with a great amount of noise.

If the feature point data corresponding to the input fingerprint image exists, the fingerprint image input unit 31 inputs the feature point data along with the fingerprint image to be input. The feature point data input at step S01 may be feature point data which is automatically extracted through a process performed in advance in a device different from the feature point input assisting device 30 or in the feature point input assisting device 30. Alternatively, the feature point data input at step S01 may be feature point data manually input by the examiner with a different system. The feature point data corresponding to the fingerprint image to be input may be absent at step S01.

In step S02, the feature point input assisting unit 32 displays the input fingerprint image on the data display device 20. In this case, when the feature point data corresponding to the input fingerprint image exists, the feature point input assisting unit 32 reflects the feature point data on the fingerprint image, and has the data display device 20 display the fingerprint image.

Figure 6:
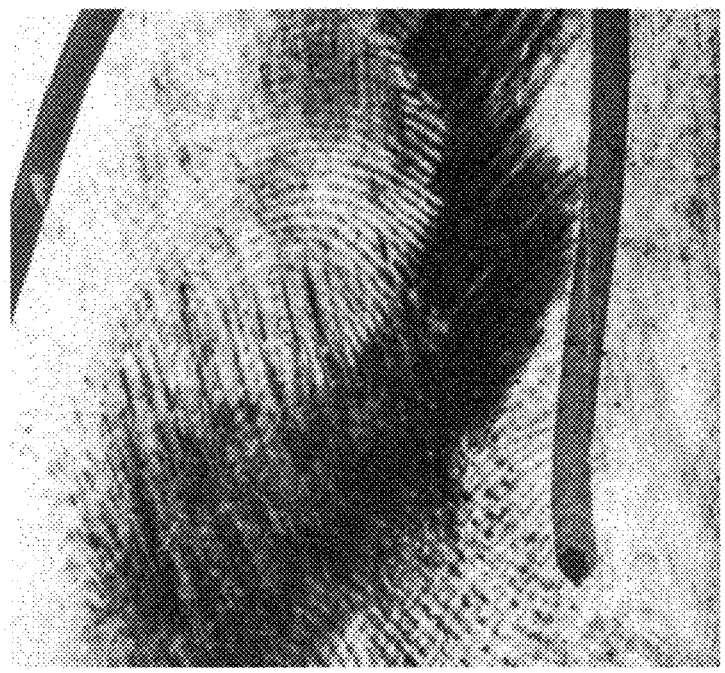
FIG. 6 is a view showing one example of a fingerprint image.
Figure 7A:
FIG. 7A is a view showing one example of an enlarged view of one region of FIG. 6.
Figure 7B:
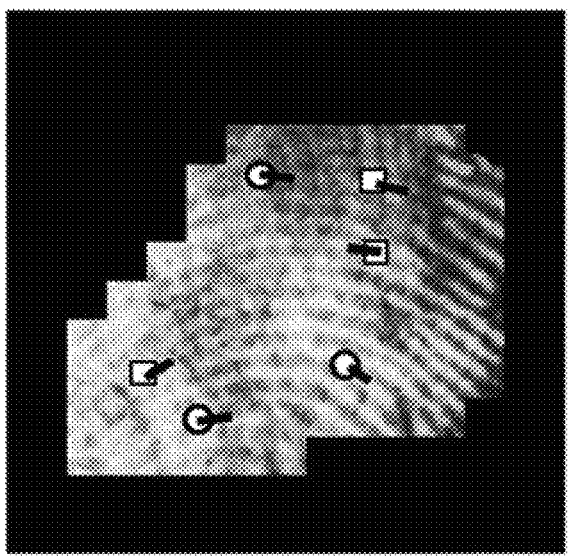
FIG. 7B is a view showing one example of an enlarged view of one region of FIG. 6.

FIG. 7A is an enlarged view of one region of the fingerprint image shown in FIG. 6. FIG. 7B is an example of when the feature point data is superimposed and displayed on the fingerprint image shown in FIG. 7A. The feature point data superimposed and displayed in FIG. 7B is the feature point data manually input in advance by the examiner.

In the fingerprint image and the like after FIG. 7, the blackened region is a region determined by the examiner that the ridge lines are unclear. Such region is excluded from the extraction of the feature point and the matching process of the fingerprint image. In the figures after FIG. 7, the end point of the ridge line is represented with a circle, and the bifurcation is represented with a square. The feature point direction is represented with a short line drawn from the feature point.

In step S03, the feature point input unit 203 of the feature point input assisting unit 32 assists the manual correction input of the feature point by the examiner.

Figure 8:
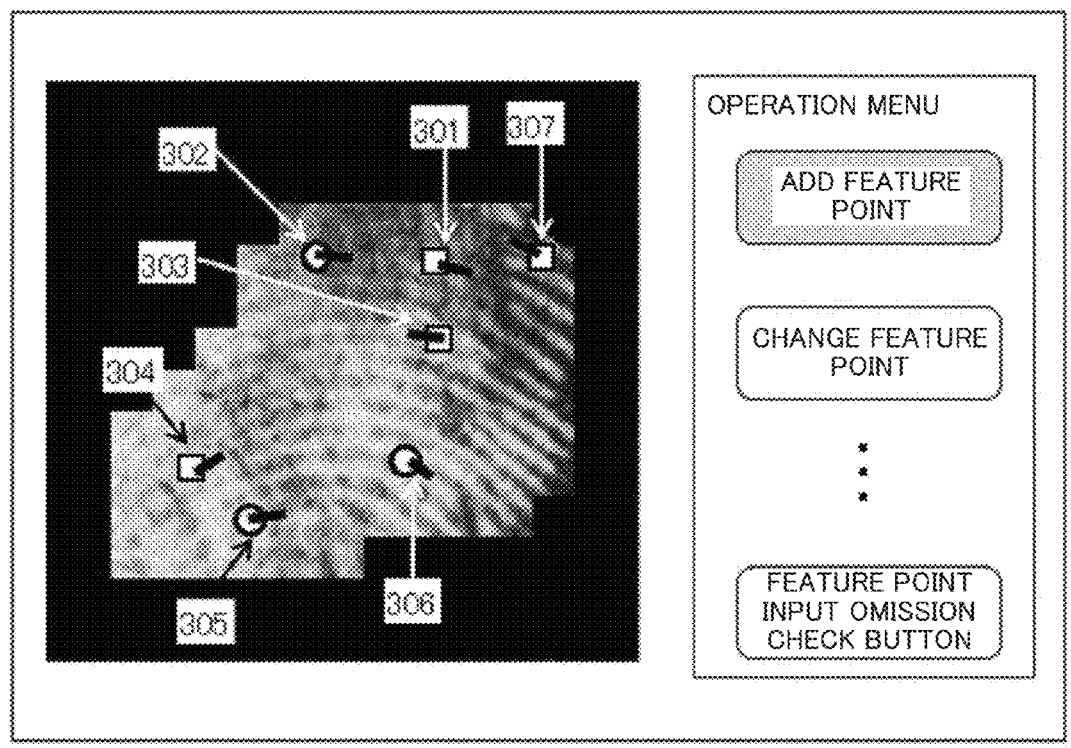
FIG. 8 is a view showing one example of a manual correction input screen displayed on a data display device.

FIG. 8 is a view showing one example of the manual correction input screen displayed on the data display device 20. The examiner uses the data input device 10 comprising a mouse and the like, for example, to carry out the manual correction input of the feature point on the fingerprint image displayed on the data display device 20. Specifically, if the feature point data is already superimposed and displayed, the examiner deletes the initial input feature point or adds a new feature point. In the example of FIG. 8, a feature point 307 is assumed to be newly added by the examiner.

The examiner pushes the feature point input omission check button displayed on the data display device 20 at the time when the manual correction input of the feature point is assumed to have terminated. Of course, when the examiner determines that the initial input feature point is appropriate, the examiner does not carry out any manual correction input and may push the feature point input omission check button. Even if the manual correction input is not carried out, the examiner can assume that the appropriateness of the initial input feature point is determined on the basis of his/her specialized knowledge.

The feature point input unit 203 stores the data (hereinafter referred to as input feature point data) of the feature point (input feature point) obtained by the manual correction input of the feature point by the examiner in the storage unit 202. Specifically, the feature point input unit 203 stores coordinate data representing the position of the input feature point in the fingerprint image and the direction data representing the feature point direction in the storage unit 202 as the input feature point data.

When the examiner pushes the feature point input omission check button, the processes after step S04 are executed. The data processing control unit 201 of the feature point input assisting unit 32 activates the feature point extracting unit 204 (executes the feature point extracting process) with the pushing of the feature point input omission check button as a trigger.

The feature point extracting unit 204 acquires the data of the fingerprint image and the input feature point data stored in the storage unit 202, and executes the feature point extracting process (step S04). In this case, the feature point extracting unit 204 executes various types of processes of the feature point extraction so as to adapt to the input feature point. The appropriateness of the input feature point is confirmed by the examiner, and thus such input feature point is assumed to be a correct feature point.

FIG. 9 is a flowchart showing one example of an operation of the feature point extracting unit 204.

The feature point extracting unit 204 executes the following seven processes to extract the feature point from the fingerprint image.

(1) image grayscale emphasizing process
(2) ridge line direction extracting process
(3) ridge line interval extracting process
(4) ridge line emphasizing process
(5) binary process
(6) skeleton process
(7) feature point extracting process In step S101, the feature point extracting unit 204 executes the image grayscale emphasizing process using the input feature point data. Specifically, when executing the image grayscale emphasizing process, the feature point extracting unit 204 changes the density (pixel value) of the coordinate position of the input feature point data and the vicinity region thereof. More specifically, the feature point extracting unit 204 applies a feature point mask defined according to the type (end point or bifurcation) and the feature point direction of the input feature point on a position corresponding to the input feature point in the fingerprint image to change the pixel value of the input feature point data and the vicinity region thereof.

Figure 10A:
FIG. 10A is a view describing a feature point mask.
Figure 10B:
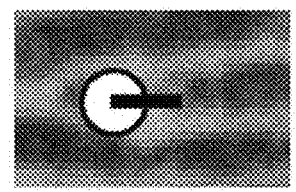
FIG. 10B is a view describing a feature point mask.
Figure 10C:
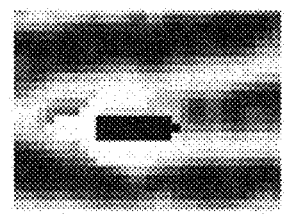
FIG. 10C is a view describing a feature point mask.

FIG. 10A through FIG. 10C describe feature point masks. FIG. 10A is an example of a feature point mask applied on the rightward end point in the horizontal direction.

The feature point mask shown in FIG. 10A has the high density of the region corresponding to the ridge line. For example, when representing the pixel value with eight bits, the pixel value of the region corresponding to the ridge line is set to a maximum density value (255; black). The density of the region corresponding to the ridge line groove which is formed between the ridge lines is set low. For example, the pixel value of the region corresponding to the ridge line groove is set to a minimum density value (0; white). In FIG. 10A the region corresponding to the ridge line groove is shown in gray from the standpoint of visibility.

The width of the ridge line and the ridge line groove of the feature point mask is appropriately designed according to the size, the resolution, and the like of the fingerprint image to be applied the feature point mask. For example, if the average ridge line interval in the fingerprint image is 0.5 millimeter (ten pixels), the ridge line width of the feature point mask is similarly set to 0.05 millimeter.

The feature point mask shown in FIG. 10A is applied when the direction of the end point is the right horizontal direction. If the direction of the end point is the other direction, the feature point mask shown in FIG. 10A is appropriately rotated to design the corresponding feature point mask. In the feature point mask to be applied to the bifurcation, the pixel value of the feature point mask for the end point may be inverted (black and white inverted).

The feature point extracting unit 204 replaces the pixel value of the position corresponding to the input feature point data on the fingerprint image and the vicinity region thereof with the pixel value set in the feature point mask. For example, assume a case in which the feature point (end point) exists on the fingerprint image, as shown in FIG. 10B. In this case, the feature point extracting unit 204 applies the feature point mask of FIG. 10A on the relevant feature point to obtain the fingerprint image shown in FIG. 10C.

Figure 11:
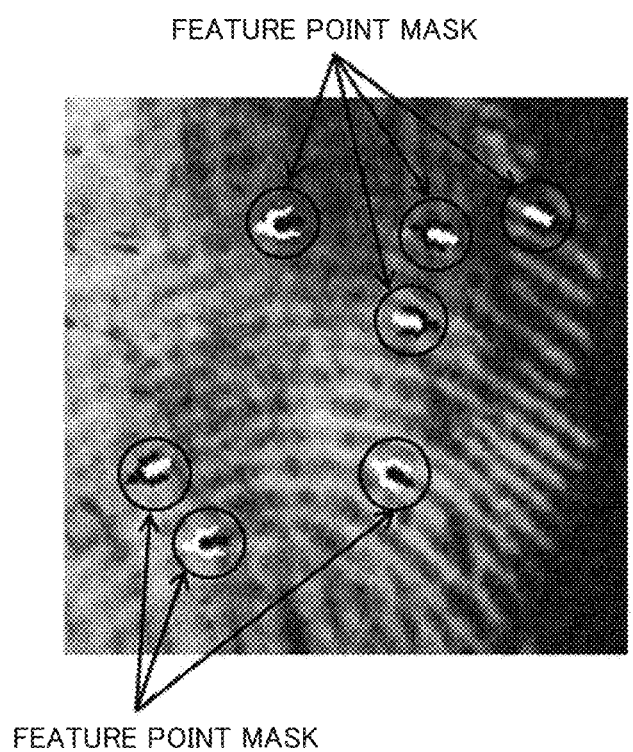
FIG. 11 is a view showing one example in which a feature point mask is applied on the fingerprint image shown in FIG. 7.

The feature point extracting unit 204 applies the feature point mask on each input feature point data in the fingerprint image. With reference to FIG. 11, the image grayscale emphasizing process for applying the feature point mask on seven input feature points 301 to 307 is carried out, and the density emphasis is carried out on the input feature point and the vicinity region thereof.

In step S102, the feature point extracting unit 204 executes the ridge line direction extracting process using the input feature point data.

The feature point direction is defined for each input feature point. The feature point extracting unit 204 determines the direction of the ridge line which is contained in a predetermined range (e.g., region 401 and region 402 of FIG. 12A, to be described later) having each input feature point of the fingerprint image (e.g., fingerprint image shown in FIG. 11) applied with the feature point mask as the center based on the feature point direction of each input feature point.

Normally, the direction of the feature point coincides with the direction of the ridge line existing in the vicinity thereof. Therefore, the feature point extracting unit 204 sets the direction of the ridge line existing in the vicinity of the input feature point as the feature point direction of the input feature point to determine the direction of the ridge line in the vicinity region of the input feature point, and thus obtains a appropriate result. The feature point extracting unit 204 then determines the ridge line direction of the vicinity region of each input feature point in the fingerprint image by using the direction of each input feature point.

Figure 12A:
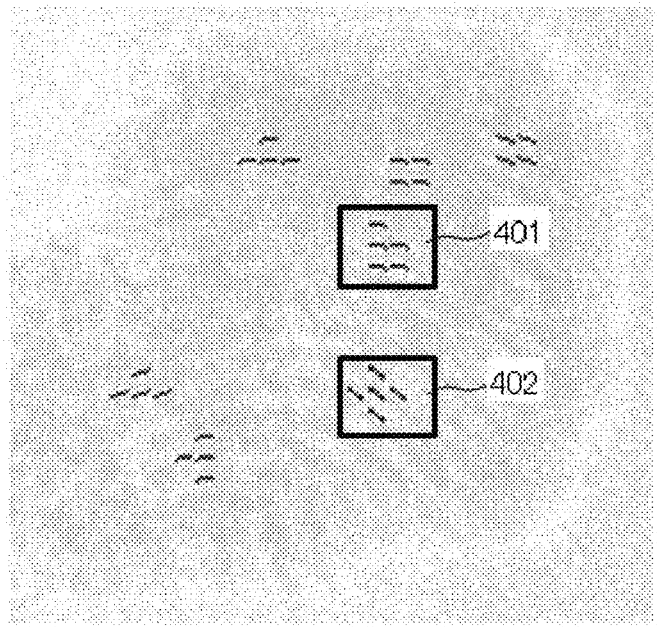
FIG. 12A is a view describing a determination related to a ridge line direction in the fingerprint image.

FIG. 12A is a view showing one example of the ridge line direction of the vicinity region of the input feature point in the fingerprint image shown in FIG. 11. In the figures after FIG. 12A, the direction of the short line indicates the ridge line direction of the local region thereof. In the figures after FIG. 12A, the direction of the ridge line direction is quantized and displayed for every about 11.2 degrees (180/16).

With reference to FIG. 12A, the ridge line direction of the regions 401, 402 (e.g., about 20 pixels with input feature point as center) located in the vicinity of each input feature point is determined to be the direction of the input feature point.

Then, the feature point extracting unit 204 extracts the ridge line direction of the region in which the ridge line direction is not determined. In this case, when extracting the direction of the ridge line existing in the peripheral region (predetermined range defined in advance; e.g., about 60 pixels with input feature point as center) of each input feature point, the feature point extracting unit 204 extracts the ridge line direction in the peripheral region by using the direction of the input feature point. Specifically, the feature point extracting unit 204 extracts the direction of the ridge line contained in the adjacent region of the region including the ridge line, in which the direction is already determined, based on the ridge line direction in which the direction is already determined.

Figure 12B:
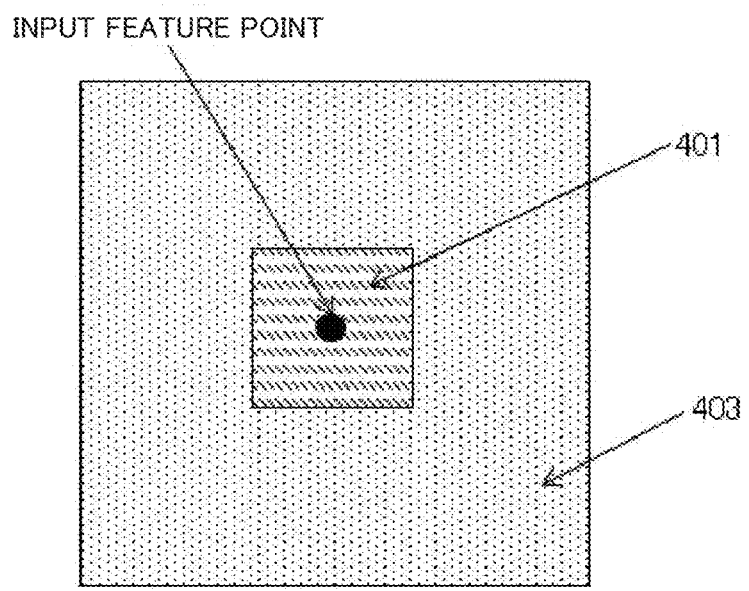
FIG. 12B is a view describing a determination related to a ridge line direction in the fingerprint image.

For example, with reference to FIG. 12B, the feature point extracting unit 204 extracts the ridge line direction in the region 403 which does not includes the region 401, the region being the peripheral region of the feature point defined in advance, based on the direction of the ridge line in the region 401 in which the ridge line direction is already determined.

When calculating the ridge line direction from the fingerprint image, the feature point extracting unit 204 may also calculate the reliability of the ridge line direction, and extract the ridge line direction with the calculated reliability. For example, the feature point extracting unit 204 uses an estimated value from the direction of the ridge line included in the adjacent region when the calculated reliability is low. The feature point extracting unit 204, for example, use the ridge line direction calculated from the fingerprint image when the calculated reliability is high.

Alternatively, in the ridge line direction extracting process disclosed in Patent Literature 2, the region in which the ridge line direction is already determined is set as a high reliability zone and the other regions are set as reference region zones, so that the feature point extracting unit 204 may extract the ridge line direction of the region in which the ridge line direction is not determined.

Figure 13A:
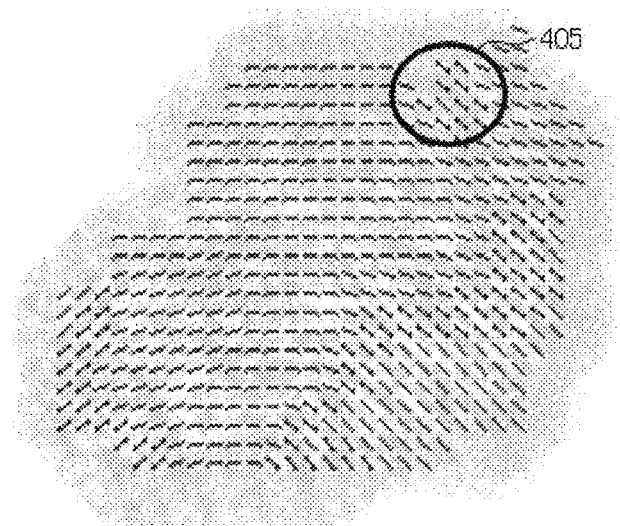
FIG. 13A is a view showing one example of an extracting result in the ridge line direction.
Figure 13B:
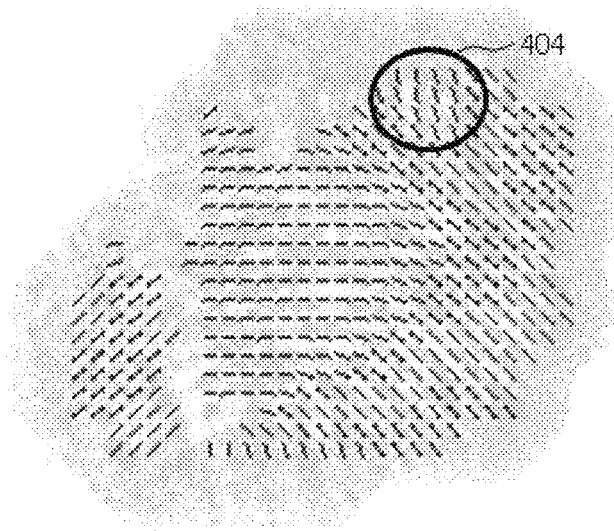
FIG. 13B is a view showing one example of an extracting result in the ridge line direction.

FIG. 13A and FIG. 13A show examples of an extracting result of the ridge line direction. FIG. 13A is a view showing one example of the ridge line direction data of when the feature point extracting unit 204 extracted the ridge line direction of the vicinity region thereof, by using the direction of each input feature point. FIG. 13B is a view showing one example of the ridge line direction data of when the feature point extracting unit 204 extracted the ridge line direction without using the direction of each input feature point. When the feature point extracting unit 204 extracts the ridge line direction without using the direction of the input feature point, the noise in the perpendicular direction may influence and the ridge line direction may possibly be detected by mistake as the perpendicular direction (see. e.g., region 404 of FIG. 13B. The feature point extracting unit 204, on the other hand, can extract the correct ridge line direction when extracting the ridge line direction with the direction of the input feature point (see region 405 of FIG. 13A).

In step S103, the feature point extracting unit 204 executes the ridge line interval extracting process. The feature point extracting unit 204 calculates an average distance between the ridge lines included in the fingerprint image, and extracts the ridge line interval of the fingerprint image.

In step S104, the feature point extracting unit 204 executes the ridge line emphasizing process using the ridge line direction. Specifically, the feature point extracting unit 204 carries out a process of emphasizing the ridge line of the fingerprint image based on the feature point direction of the input feature point. For example, in the ridge line emphasizing process disclosed in Patent Literature 3, the feature point extracting unit 204 calculates a representative line from the feature point direction of the input feature point and emphasizes the ridge line so as to adapt to the direction of the representative line.

Figure 14:
FIG. 14 is a view showing one example of a fingerprint image obtained by executing a ridge line emphasizing process with the ridge line direction data shown in FIG. 13A.

FIG. 14 is a view showing one example of the fingerprint image obtained when the feature point extracting unit 204 executes the ridge line emphasizing process using the ridge line direction data shown in FIG. 13A.

In step S105, the feature point extracting unit 204 executes the binary process of the fingerprint image. Specifically, the feature point extracting unit 204 performs a threshold process on the pixel value of each pixel configuring the fingerprint image obtained in the previous step to binarize the fingerprint image. The feature point extracting unit 204 may apply the feature point mask on the input feature point when binarizing the fingerprint image, similar to the image grayscale emphasizing process in step S101.

In step S106, the feature point extracting unit 204 executes the skeleton process using the input feature point data. The skeleton process of the fingerprint image is often configured by a thin line process of thinning the ridge line of the binarized fingerprint image, and the skeleton correcting process of correcting the thinned ridge line (i.e., skeleton).

The skeleton correcting process includes a process of removing a whisker-like skeleton, a process of removing a bridge-like skeleton, a process of coupling the opposing end points, and the like. When executing the processes of removing the whisker-like skeleton and the bridge-like skeleton, the feature point extracting unit 204 uses the ridge line interval extracted in step S103. The feature point extracting unit 204 assumes the ridge line as noise and removes the relevant ridge line if the ridge line exists at intervals significantly shorter than the average ridge line interval.

When carrying out the skeleton correcting process described above, the feature point extracting unit 204 uses the input feature point data. Specifically, when executing the process of coupling the opposing end points, the feature point extracting unit 204 excludes the input feature point (uncouples the opposing end points) if at least one of the end points is the input feature point.

Figure 15:
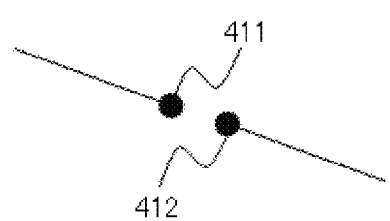
FIG. 15 is a view describing use of input feature data in an end point coupling process.

For example, with reference to FIG. 15, if neither the two end points 411 nor 412 is the input feature point, the feature point extracting unit 204 determines such end points as noise of the fingerprint image, and may couple such end points. That is, the two feature points (end points) may be deleted by the end point coupling process by the feature point extracting unit 204.

If at least one of the two end points 411 and 412 is the input feature point, the feature point extracting unit 204 does not couple the two end points. In other words, the feature point extracting unit 204 uses the input feature point data to prevent the input feature point from being deleted by the end point coupling process.

Figure 16:
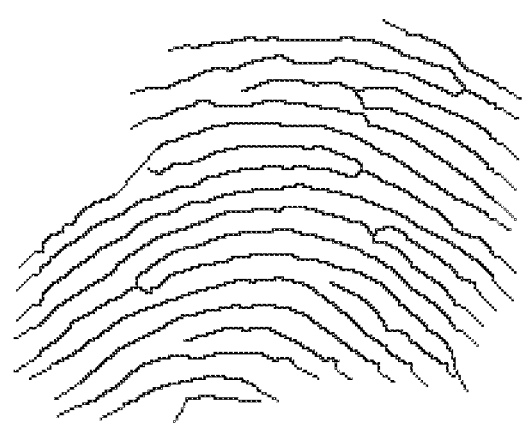
FIG. 16 is a view showing one example of skeleton data obtained by applying a skeleton process on the fingerprint image shown in FIG. 14.

FIG. 16 is a view showing one example of the skeleton data obtained by applying the skeleton process on the fingerprint image shown in FIG. 14.

In step S107, the feature point extracting unit 204 executes the feature point extracting process. The feature point extracting unit 204 extracts the end point and the bifurcation of the skeleton from the skeleton data of the fingerprint image, and extracts such end point and the bifurcation as the feature point.

Figure 17:
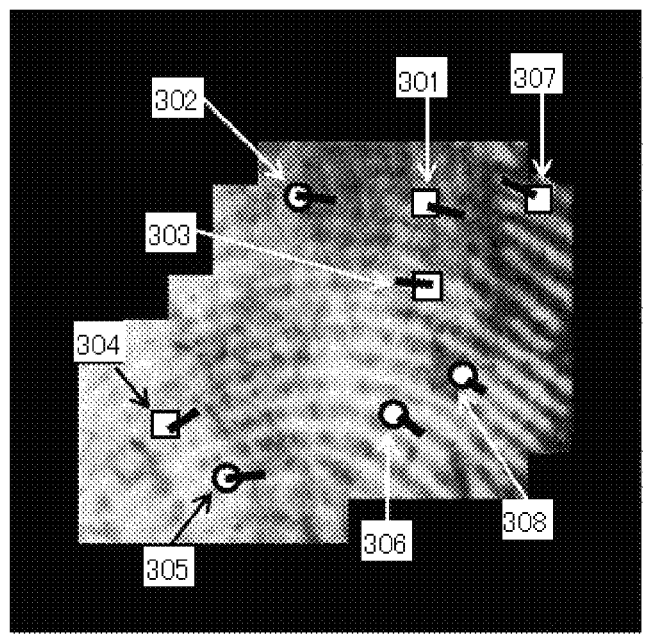
FIG. 17 is a view in which the extracted feature point is reflected on the fingerprint image.

FIG. 17 is a view reflecting the feature point extracted by the feature point extracting unit 204 to the input fingerprint image. Comparing FIG. 8 with FIG. 17, seven feature points 301 to 307, which are carried out the manual correction input of the feature point by the examiner, are held (reproduced) as is in FIG. 17 as well. In other words, the feature point extracting unit 204 extracts the skeleton indicating the center of the ridge line from the fingerprint image by using the input feature point, and extracts the feature point based on the extracted skeleton.

Furthermore, comparing FIG. 8 with FIG. 17, it can be understood that a feature point 308 is also extracted by the feature point extracting unit 204, in addition to the seven feature points 301 to 307.

When the extraction of the feature point using the input feature point data is terminated, the feature point extracting unit 204 stores the data (the coordinate and the feature point direction in fingerprint image, etc.) related to the extracted feature point in the storage unit 202.

The process of step S04 shown in FIG. 5 is thereby terminated. When the process of the feature point extracting unit 204 is terminated, the data processing control unit 201 activates the input omission candidate extracting unit 205 (executes the extracting process of the input omission feature point candidate).

In step S05 of FIG. 5, the input omission candidate extracting unit 205 carries out a comparing process of the input feature point which is performed with the manual correction input by the examiner with the feature point (the extracted feature point) extracted by the feature point extracting unit 204 to calculate the input omission feature point candidate.

Specifically, if a differential value between the coordinates of two feature points (an input feature point, an extracted feature point) and a direction difference between the two feature points are within predetermined ranges, the input omission candidate extracting unit 205 determines that such two feature points are a pair of feature points. For example, if the differential value between the coordinates of the two feature points is not larger than four pixels and the direction difference between the two feature points is not larger than 45 degrees, the input omission candidate extracting unit 205 determines that the two feature points form a pair. The input omission candidate extracting unit 205 executes two comparing processes described above to specify the extracted feature point which has no input feature point forming a pair therewith (extracted the feature point which has no corresponding input feature point).

The extracted feature point that has no input feature point forming a pair therewith has a possibility of being the input omission in the manual correction input of the feature point by the examiner, and is a feature point which existence needs to be recognized by the examiner.

The input omission candidate extracting unit 205 extracts the extracted feature point that has no input feature point forming a pair as the input omission feature point candidate. Comparing FIG. 8 with 17, since the feature point 308 has no input feature point forming a pair therewith, the input omission candidate extracting unit 205 extracts the feature point 308 as the input omission feature point candidate.

The input omission candidate extracting unit 205 stores the data for the input omission feature point candidate (the feature point 308 in the example described above) in the storage unit 202.

In step S06 of FIG. 5, the data process control unit 201 reflects the input omission feature point candidate extracted by the input omission candidate extracting unit 205 on the fingerprint image on which the examiner performs the manual correction input of the feature point. The data process control unit 201 has display device 20 display the fingerprint image.

Figure 18:
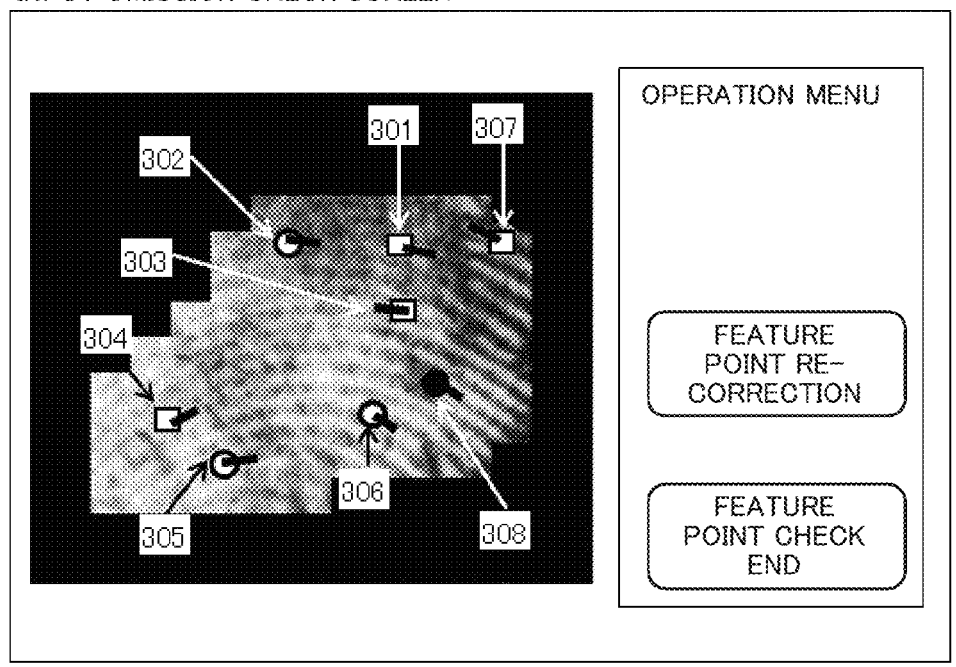
FIG. 18 is a view showing one example of a fingerprint image on which an input omission feature point candidate is reflected.

FIG. 18 is a view showing one example of the fingerprint image on which the input omission feature point candidate is reflected. In FIG. 18, the feature points 301 to 307 are input feature points which is input (the appropriateness is confirmed) by the examiner. The feature point 308 is a feature point displayed as the input omission feature point candidate.

When actually displaying the image of FIG. 18, it is preferable that the data display device 20 may changes color of the feature point 308 or flashes the same, which is the input omission feature point candidate, so that the examiner can find the feature point 308. It is preferable that the data display device 20 characterizes the display mode of the input omission feature point candidate to get the attention of the examiner to the input omission feature point candidate.

The examiner checks the image in the vicinity of the feature point 308, which is the input omission feature point candidate, shown in FIG. 18, and checks whether or not the input omission of the feature point actually occurred. If determined that the feature point input omission occurred, the examiner pushes a feature point re-correction button. If determined that the feature point input omission does not occurred, the examiner pushes a feature point check end button.

In step S07 of FIG. 5, the data process control unit 201 determines whether or not the re-correction of the feature point is necessary. Specifically, when the feature point re-correction button is pushed by the examiner (step S07, Yes branch), the data process control unit 201 repeats the processes after step S03.

The examiner carries out the manual correction input such as inputting the feature point presented as the input omission feature point candidate to the fingerprint image. However, when the examiner resets the feature point, the input omission feature point candidate (the feature point 308 in the example described above) displayed on the data display device 20 is merely simple reference information. Therefore, the examiner may input a feature point different from the input omission feature point candidate.

Figure 19:
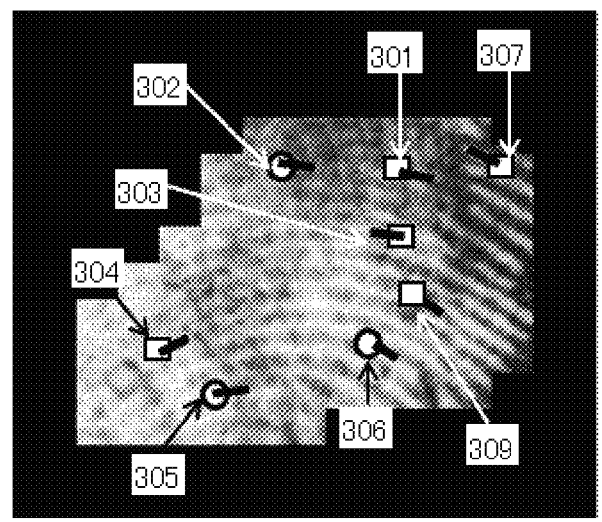
FIG. 19 is a view describing a manual correction re-input of a feature point by an examiner.

For example, even if the end point is presented (the end point is automatically extracted) as the input omission feature point candidate, when the examiner determines that the new feature point to be added is a bifurcation, and the position thereof is on the left side than the position of input omission feature point candidate, the examiner inputs such feature point to the fingerprint image. In this case, for example, as shown in FIG. 19, the examiner inputs a feature point 309, which is not the end point but the bifurcation, to the position on the left side by five pixels from the position of the feature point 308 presented as the input omission feature point candidate.

The feature point input assisting unit 32 again executes step S04 of FIG. 5. That is, the feature point extracting unit 204 extracts the feature point from the fingerprint image by using the re-input input feature point.

Figure 20:
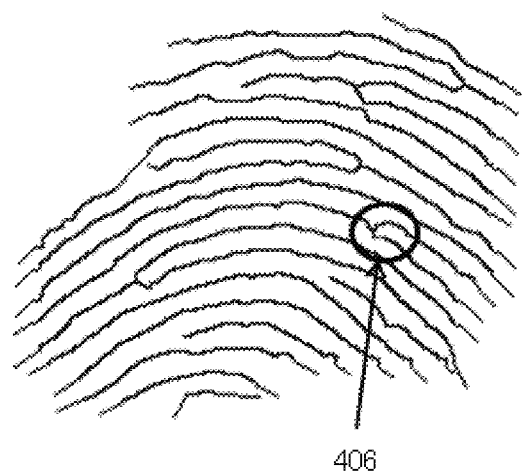
FIG. 20 is one example of skeleton data extracted using the re-input input feature point.

FIG. 20 is an example of skeleton data extracted using the re-input input feature point. With reference to FIG. 20, it can be seen that the skeleton is extracted so as to form the bifurcation at the position corresponding to the feature point 309 added by the examiner (see the region 406). In other words, when the examiner inputs the new feature point, the ridge line structure of the fingerprint image also changes. The feature point extracting unit 204 extracts the skeleton data by using the re-input input feature point when the examiner re-inputs the feature point, so that the ridge line structure generated by the addition of a new feature point can be automatically extracted.

When the examiner pushes the feature point check end button shown in FIG. 18 (step S07 of FIG. 5, No branch), the data process control unit 201 carries out the process of step S08.

In step S08, the data process control unit 201 instructs the fingerprint data output unit 33 to output the feature point data in which the input omission check of the feature point by the examiner is terminated, and the like to the matching device 40 as the fingerprint data.

Therefore, the feature point input assisting device 30 in the first exemplary embodiment extracts the feature point (the extracted feature point) from the fingerprint image by using the feature point (the input feature point) manually input by the examiner. When the feature point which has no corresponding input feature point is extracted, the feature point input assisting device 30 sets the relevant feature point as the input omission feature point candidate. The feature point input assisting device 30 presents the input omission feature point candidate to the examiner to get the attention of the examiner. The examiner who checked the input omission feature point candidate determines whether or not input omission of a feature point actually exists, and again carries out the manual correction input of the feature point when determining that the input omission occurred. The feature point input assisting device 30 repeats the calculation of the input omission feature point and the check of the input omission of the feature point by the examiner to provide accurate feature point data to the matching device 40. In other words, the feature point input assisting device 30 can reduce the load of the examiner required in ensuring sufficient matching accuracy.

Consider a case in which the matching device 40 uses the number of ridge lines between the feature points as the feature quantity, and carries out the fingerprint matching. If the feature point data which is input by the matching device 40 after the examiner carries out the manual correction input of the feature point, and the skeleton data which is input by the matching device 40 are in contradiction, the number of ridge lines between the feature point cannot be assumed as the feature quantity of the fingerprint image. Alternatively, if the feature point data and the skeleton data are mismatch, the accuracy in the extraction of the number of ridge lines between the feature points are degraded, and the final finger matching accuracy may be degraded. That is, in the fingerprint matching system that uses the number of ridge lines between the vicinity feature points as the feature quantity, the extraction of the correct skeleton data becomes important.

A solution to such problem is proposed in Patent Literature 4. However, in the correction method described in Patent Literature 4, the number of ridges between the feature points depending on the manual correction input of the feature point needs to be corrected, and the load of the examiner increases.

Figure 21:
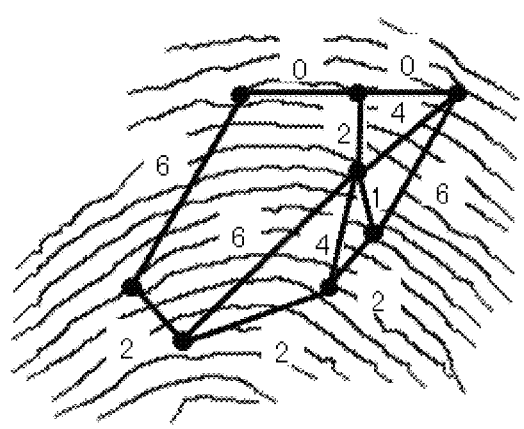
FIG. 21 is a view showing one example of the number of ridge lines between the feature points on the skeleton data shown in FIG. 20.

The feature point input assisting device 30 according to the first exemplary embodiment extracts the skeleton data by using the feature point carried out the manual correction input by the examiner. That is, the feature point input assisting device 30 automatically generates the skeleton data that does not contradict the input feature point data. If the feature point input assisting device 30 can correctly extract the skeleton, the matching device 40 can extract the number of ridge lines between the feature points through a simple process of counting the skeletons which is intersected with the line connecting the feature points (see FIG. 21: number denoted to the vicinity of the line shown in FIG. 21 indicates the number of ridge lines between the feature points).

The feature point input assisting device 30 provides the feature point data and the corresponding skeleton data to the matching device 40 so as to contribute to the enhancement of the matching accuracy in the matching device 40. In this case, the correction in the number of ridge lines between the feature points is not requested on the examiner, and thus the load of the examiner does not increase.

Second Exemplary Embodiment

A second exemplary embodiment now will be described in detail with reference to the drawings.

In the first exemplary embodiment, a correction example, in which the examiner adds and changes the corresponding feature point to the feature point displayed as the input omission feature point candidate, has been described. In the second exemplary embodiment, a correction example of removing the input omission feature point will be described.

Figure 22A:
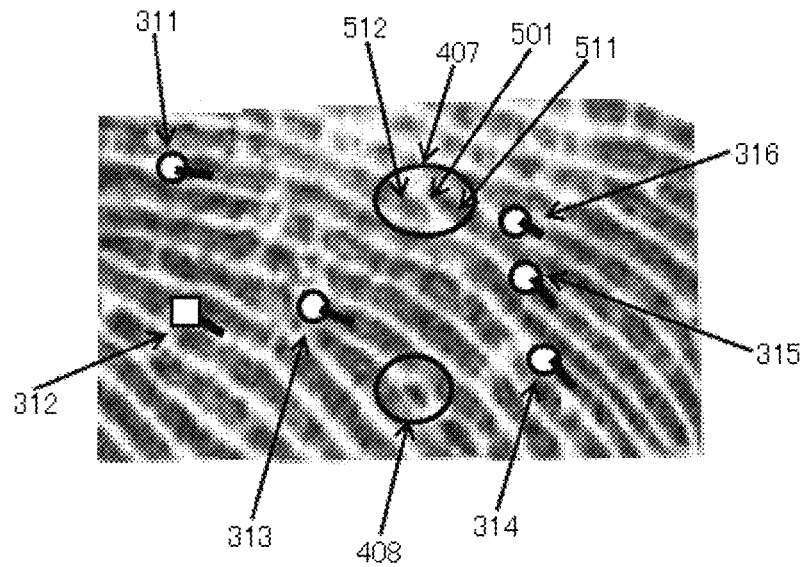
FIG. 22A is a view describing a feature point input and correction by the examiner according to a second exemplary embodiment.

Assume that the examiner input the feature point as shown in FIG. 22A by using the manual correction input screen. In FIG. 22A, the examiner carries out the manual correction input with six feature points 311 to 316.

Figure 22B:
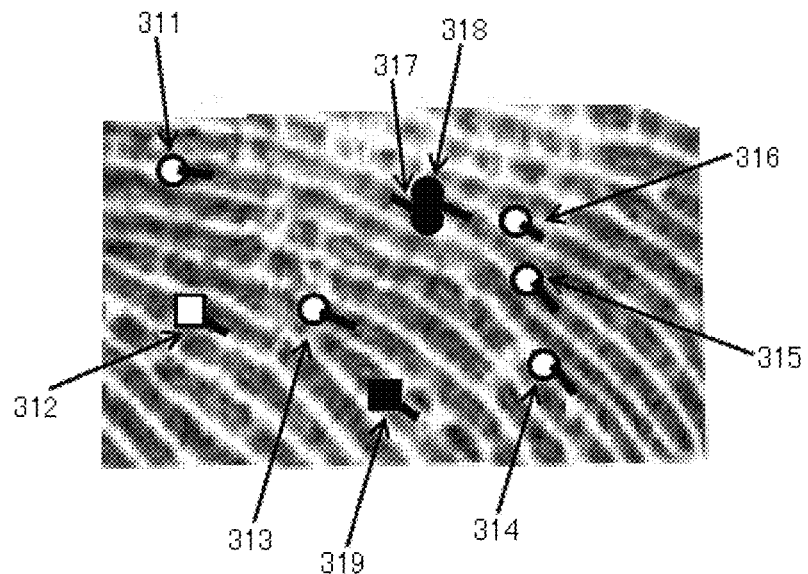
FIG. 22B is a view describing a feature point input and correction by the examiner according to a second exemplary embodiment.

The feature point input assisting unit 32 in the feature point input assisting device 30a according to the second exemplary embodiment displays the fingerprint image for the input omission check screen shown in FIG. 22B on the data display device 20. The input feature point is shown in FIG. 22A. With reference to FIG. 22B, the data display device 20 displays the feature points 317 to 319 as the input omission feature point candidates which have no corresponding input feature point.

The feature point 317 and the feature point 318 are extracted in response to the biting ridge lines existing in the region 407 of FIG. 22A. The feature point 319 is extracted in response to a dot-like short line existing in the region 408 of FIG. 22A.

When the examiner checking the fingerprint image of FIG. 22B determines that the feature points 317 to 319 are originated from the noise of the fingerprint image, the examiner carries out an operation of deleting the feature points 317 to 319. In other words, the feature point input assisting device 30a provides the examiner an interface for deleting the feature points 317 to 319 in the manual correction input screen of the feature point.

The feature point input unit 203 provides an interface, with which the examiner can specify the position of the ridge line, the direction of the ridge line, and the interval of the ridge lines on the ridge line where the examiner desires to delete the feature point thereof.

Figure 23:
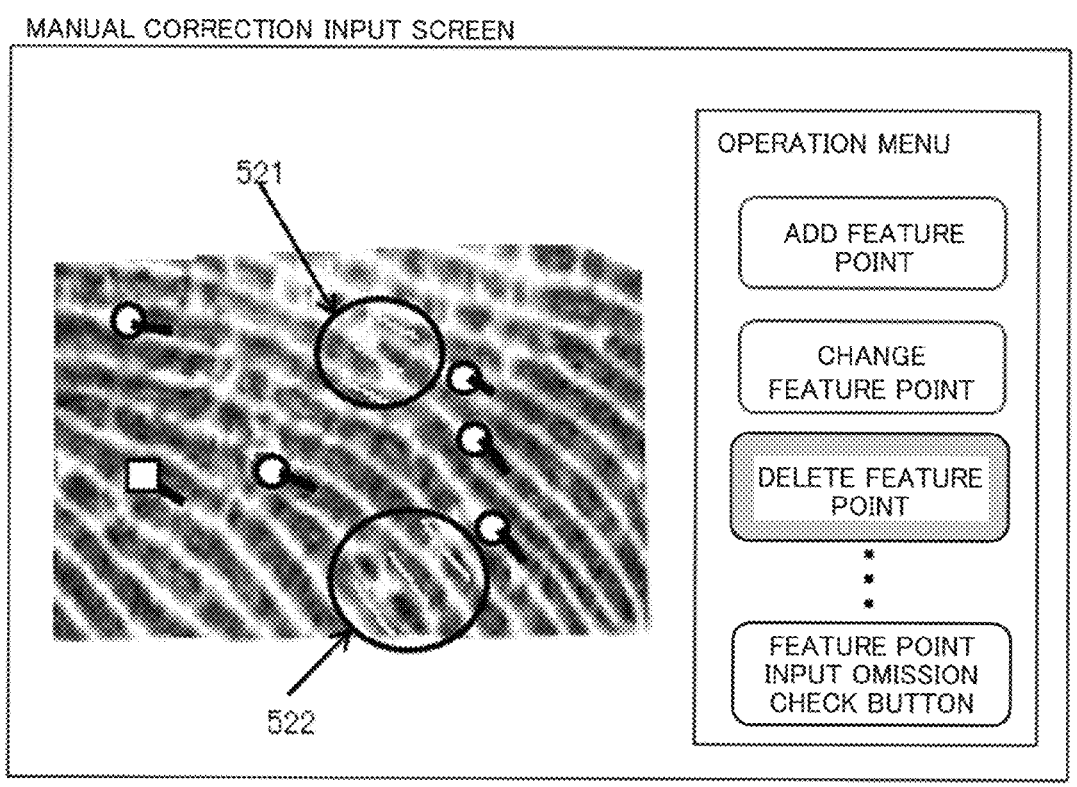
FIG. 23 is a view showing one example of a manual correction input screen according to the second exemplary embodiment.

FIG. 23 is a view showing one example of the manual correction input screen of the second exemplary embodiment. For example, if the examiner desires to delete the feature points 317 to 319 shown in FIG. 22B, the examiner arranges a typical ridge line mark so that such feature points are deleted by the ridge line. In FIG. 23, the examiner arranges a typical ridge line mark 521 on the fingerprint image so that the biting ridge lines serving as a factor for extracting the feature points 317 and 318 are deleted. When deleting the feature point 319, the examiner arranges a typical ridge line mark 522 on the fingerprint image so that the dot-like short line is deleted.

The typical ridge line mark includes three lines. The examiner instructs the feature point input assisting device 30a to delete the feature point (the extracted feature point) by adjusting the direction of the three lines displayed as the typical ridge line mark, and the interval between the lines. The feature point extracting unit 204 also uses the typical ridge line mark arranged by the examiner to extract the feature point from the fingerprint image in the extracting process of the feature point shown in step S04 of FIG. 5. Specifically, the feature point extracting unit 204 applies a feature point deleting mask corresponding to the typical ridge line mark on the fingerprint image in the image grayscale emphasizing process in step S101 of FIG. 9.

Figure 24A:
FIG. 24A is a view describing a feature point deleting mask.
Figure 24B:
FIG. 24B is a view describing a feature point deleting mask.
Figure 24C:
FIG. 24C is a view describing a feature point deleting mask.
Figure 24D:
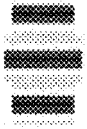
FIG. 24D is a view describing a feature point deleting mask.
Figure 24E:
FIG. 24E is a view describing a feature point deleting mask.
Figure 24F:
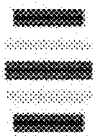
FIG. 24F is a view describing a feature point deleting mask.

FIG. 24A through FIG. 24F describes the feature point deleting masks. Each feature point deleting mask shown in FIGS. 24A to 24F is designed to adapt to the ridge line in the horizontal direction. Such feature point masks are arranged for every ridge line interval of the typical ridge line mark input by the examiner. For example, FIG. 24A is a feature point deleting mask in which the ridge line interval is designed to eight pixels. FIGS. 24B to 24F are feature point deleting masks in which the ridge line interval is increased by one pixel with the ridge line interval of the feature point deleting mask shown in FIG. 24A as a reference.

Similar to the feature point mask, in the feature point deleting masks shown in FIG. 24A through FIG. 24F, the density of the region corresponding to the ridge line is set high (e.g., a maximum density value of 255). In the feature point deleting mask, the density of the region corresponding to the ridge line groove which is formed between the ridge lines is set low (e.g., a minimum density value of 0). The feature point deleting mask other than in the horizontal direction is easily generated by appropriately rotating the feature point deleting mask shown in FIG. 24A through FIG. 24F.

The feature point extracting unit 204 applies each process shown in FIG. 9 to the fingerprint image which is applied with the feature point deleting mask, and extracts the feature point and the skeleton.

Figure 25:
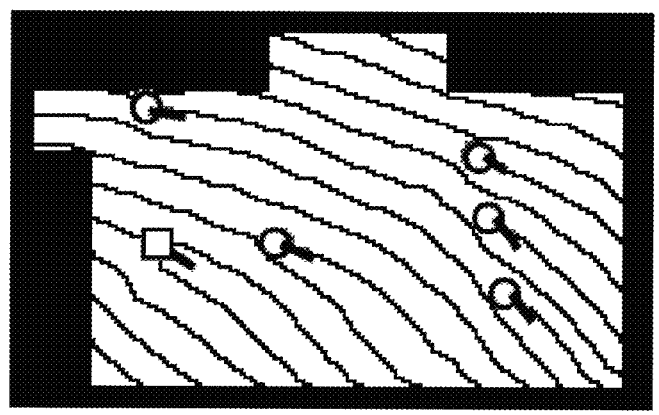
FIG. 25 is a view showing one example of skeleton data in which a feature point deleting mask corresponding to a typical ridge line mark shown in FIG. 23 is applied to a fingerprint image shown in FIG. 22A.

FIG. 25 is a view showing an example of the skeleton data in which the feature point deleting mask corresponding to the typical ridge line marks 521 and 522 shown in FIG. 23 are applied to the fingerprint image shown in FIG. 22A. With reference to FIG. 25, it can be confirmed that the feature points 317 to 319 displayed as the input omission feature point candidates in FIG. 22B are removed.

Therefore, the feature point input assisting device 30a according to the second exemplary embodiment removes the noise on the fingerprint image that causes the feature point by using the typical ridge line mark and the feature point deleting mask. As a result, the noise and inappropriate feature points are deleted from the fingerprint image, so that the ridge line direction data and the skeleton data are accurately extracted.

In the first and second exemplary embodiments, the description has been made using the fingerprint image as the input image by way of example, but the input image is not limited to the fingerprint image. For example, the present application can also be applied to a palm print image, which is an image having a curved stripe pattern similar to the fingerprint.

The examiner has been described by way of example as a main person for setting the feature point in the fingerprint image, but a person other than a specialist in dactyloscopy may set the feature point.

In the first exemplary embodiment, the feature point input assisting device 30 and the matching device 40 have been described as different devices with reference to FIG. 2, but the fingerprint matching function may be incorporated in the feature point input assisting device 30.

Alternatively, the data input device 10 and the data display device 20 may be not directly connected to the feature point input assisting device 30. For example, the data used for the setting of the feature point by the examiner and for providing information to the examiner may be input/output through the network and the external storage medium.

In the description made above, the feature point is extracted by executing the seven processes shown in FIG. 9 when extracting the feature point, but the seven processes do not necessarily need to be executed. For example, the process to be executed may be appropriately chosen according to the quality of the input fingerprint image.

In the second exemplary embodiment, a case of deleting the feature point by using the typical ridge line mark and the feature point deleting mask has been described, but the mark and the mask image used for the deletion of the feature point are not limited thereto. For example, it is difficult to delete the noise (the feature point) near the core (the center of fingerprint image) and the delta (the ridge line is branched to three directions) with the feature point deleting mask corresponding with the typical ridge line mark. Thus, an interface for deleting the feature point by using a mask designed according to such special shape is desirably prepared. For example, an innermost loop vertex mask in which an innermost loop appearing near the center of the core is designed according to the position and the direction of the vertex, and a mask designed according to the typical shape of the delta are desirably set on the fingerprint image by the examiner.

The feature point input assisting unit 32 can be realized by a computer program for causing the computer mounted on the feature point input assisting device 30 to execute the process for each unit in the feature point input assisting unit 32 by using the hardware. Furthermore, a feature point input assisting program may be installed in the storage unit of the computer so as to cause the computer to function as the feature point input assisting device. Alternatively, the computer may execute the feature point input assisting program, so that the feature point input assisting method can be executed by the computer.

Figure 26:
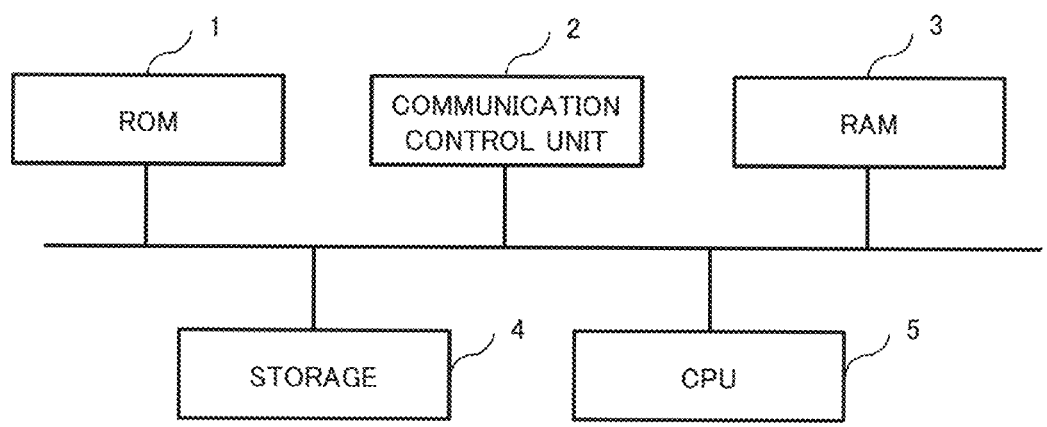
FIG. 26 is a view showing a hardware configuration of the feature point input assisting device according to the first exemplary embodiment or the second exemplary embodiment.

Next, a hardware configuration of the feature point input assisting device according to the first exemplary embodiment or the second exemplary embodiment will be described using FIG. 26. FIG. 26 shows a configuration of a hardware that can realize each configuring element according to the first exemplary embodiment or the second exemplary embodiment. The CPU 5 (Central Processing Unit) is a processor for arithmetic control, and realizes each function means of the present invention by executing the program. The ROM 1 (Read-Only Memory) stores fixed data and programs such as initial data, programs. The communication control unit 2 communicates with an external device via a network. The RAM 3 (Random Access Memory) is a random access memory used by the CPU 5 as a work area for temporary storage. The RAM 3 ensures a capacity for storing various data necessary for realizing the present invention. A large capacity storage unit 4 stores, in a non-volatile manner, the data of the database and the like, which is necessary for realizing the present invention, and the application program executed by the CPU 5. For example, the CPU 5 realizes the operations of the feature point input unit 101, the feature point extracting unit 102, the input omission candidate extracting unit 103, the feature point output unit 104, and the feature point input assisting unit 32 of the first exemplary embodiment according to the program stored in the large capacity storage unit 4 or the ROM 1. The feature point input assisting device, the data input device, the data display device, and the matching device according to the first exemplary embodiment or the second exemplary embodiment may be realized using the hardware configuration of FIG. 26. The CPU 5 is implemented by a processor circuitry, such as a microprocessor, which is capable of controlling the entire the feature point input assisting device. The processor circuitry may be one or more processors (including CPUs, ASICs, PAL'S, etc.) working together or separately.

The exemplary embodiments described above may be partially or entirely described as shown in the following supplemental notes, but are not limited thereto.

[Supplemental Note 1]

A feature point input assisting device including, a feature point input unit that sets a first feature point in an input image including a fingerprint image;

a feature point extracting unit that extracts a second feature point from the input image using the first feature point;

an input omission candidate extracting unit that extracts the second feature point which has no corresponding first feature point as an input omission feature point candidate; and a feature point output unit that outputs the input omission feature point candidate.

[Supplemental Note 2]

The feature point input assisting device according to supplemental note 1, wherein the feature point extracting unit uses the first feature point to extract a skeleton indicating a center of a ridge line from the input image, and extracts the second feature point based on the extracted skeleton.

[Supplemental Note 3]

The feature point input assisting device according to supplemental note 1 or 2, wherein the feature point input unit resets a feature point in the input image after an output of the input omission feature point candidate by the feature point output unit; and the feature point extracting unit uses the reset feature point to extract a feature point from the input image.

[Supplemental Note 4]

The feature point input assisting device according to supplemental note 3, wherein the feature point unit further includes a data output unit, which inputs a terminating instruction for the resetting of the feature point after the output of the input omission feature point candidate by the feature point output unit; and outputs to outside feature point data for specifying at least the second feature point when the terminating instruction is input.

[Supplemental Note 5]

The feature point input assisting device according to any one of supplemental notes 1 to 4, wherein the feature point extracting unit applies a feature point mask which is defined according to type and direction of the first feature point to a position which is corresponding to the first feature point in the input image.

[Supplemental Note 6]

The feature point input assisting device according to supplemental note 5, wherein the feature point mask is an image having a region corresponding to a ridge line as a first pixel value and a region corresponding to a ridge line groove between the ridge lines as a second pixel value.

[Supplemental Note 7]

The feature point input assisting device according to supplemental note 5 or 6, wherein the feature point extracting unit determines a direction of a ridge line included in a region of a predetermined range having the first feature point as a center based on a feature point direction of the first feature point.

[Supplemental Note 8]

The feature point input assisting device according to supplemental note 7, wherein the feature point extracting unit, coincides a direction of a ridge line included in a region of the predetermine range, the region being a first region having the first feature point as a center, with a feature point direction of the first feature point; and extracts a direction of a ridge line included in a region of the predetermined range, the region being a second region not including the first region, based on the feature point direction of the first feature point.

[Supplemental Note 9]

The feature point input assisting device according to supplemental note 7 or 8, wherein the feature point extracting unit emphasizes a ridge line of the input image based on the feature point direction of the first feature point.

[Supplemental Note 10]

The feature point input assisting device according to supplemental note 9, wherein the feature point extracting unit executes a thinning process of thinning the ridge line of the input image in which the ridge line is emphasized, and a skeleton correcting process of correcting the thinned ridge line, wherein the skeleton correcting process includes a process of coupling opposing end points; and the feature point extracting unit uncouples the opposing end points if at least one of the opposing end points is the first feature point.

[Supplemental Note 11]

The feature point input assisting device according to any one of supplemental notes 1 to 10, wherein the feature point input unit inputs an operation of deleting the feature point from the input image; and the feature point extracting unit applies a feature point deleting mask which is defined according to at least a direction of the ridge line and an interval between the ridge lines on a position which is corresponding to the feature point to be deleted in the input image.

[Supplemental Note 12]

The feature point input assisting device according to any one of supplemental notes 1 to 11, wherein the input omission candidate extracting unit carries out a first comparison related to positions of the first and second feature points in the input image and a second comparison related to a feature point direction of each of the first and second feature points, and determines presence/absence of the first feature point corresponding to the second feature point according to whether or not the first and second comparison results are within a predetermined range.

[Supplemental Note 13]

A feature point input assisting method including the steps of:

setting a first feature point in an input image including a fingerprint image;

extracting a second feature point from the input image by using the first feature point;

extracting the second feature point which has no corresponding first feature point as an input omission feature point candidate; and outputting the input omission feature point candidate.

[Supplemental Note 14]

A storage medium storing a program for causing a computer, which controls a feature point input assisting device, to execute processes of:

setting a first feature point in an input image including a fingerprint image;

extracting a second feature point from the input image by using the first feature point;

extracting the second feature point which has no corresponding first feature point, as an input omission feature point candidate; and outputting the input omission feature point candidate.

Similar to the mode of supplemental note 1, the mode of supplemental note 13 and the mode of supplemental note 14 can be developed to the mode of supplemental note 2 to the mode of supplemental note 12.

Each disclosure of the above-described cited Patent Literature and the like is incorporated herein by reference. The exemplary embodiments and samples can be further changed and adapted on the basis of the basic technological concept within a scope of the entire disclosure (include Claims) of the present invention. Various combinations and selections of the various disclosed elements (including each element of each Claim, each element of each exemplary embodiment and sample, each element of each figure, etc.) can be adopted within the scope of the entire disclosure of the present invention. In other words, the present invention includes various types of modifications and corrections that can be easily achieved by those skilled in the art according to the entire disclosure including the Claims and the technical concept. In particular, the numerical ranges described herein should be interpreted as being specifically described even if an arbitrary numerical value or a small range within the numerical range is unless otherwise described.

The present invention has been described with the exemplary embodiments as exemplary examples. However, the present invention is not limited to such exemplary embodiments. In other words, the present invention can be applied with various modes that can be recognized by those skilled in the art within a scope of the invention.

REFERENCE SIGNS LIST

1 ROM
2 communication control unit
3 RAM
4 large capacity storage unit
5 CPU
10 data input device
20 data display device
30, 30a, 100 feature point input assisting device
31 fingerprint image input unit
32 feature point input assisting unit
33 fingerprint data output unit
40 matching device
101, 203 feature point input unit
102, 204 feature point extracting unit
103, 205 input omission candidate extracting unit
104 feature point output unit
201 data processing control unit
202 storage unit 301 to 309, 311 to 319, 411, 412 feature point
401 to 408 region
521, 522 typical ridge line mark The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A feature point input assisting device comprising:
a memory storing instructions; and
a processor configured to execute the instructions to:
receive a manual input operation for setting a first feature point in an input image including a fingerprint image;
extract, based on the first feature point, a second feature point from the input image;
extract, based on a determination that the first feature point and the second feature point are not a pair, the second feature point as an input omission feature point candidate; and
display the input omission feature point candidate on the input image.

2. The feature point input assisting device according to claim 1, wherein the processor is further configured to execute the instructions to:
extract, based on the first feature point, a skeleton indicating a center of a ridge line from the input image; and
extract, based on the extracted skeleton, the second feature point.

3. The feature point input assisting device according to claim 1, wherein the processor is further configured to execute the instructions to:
receive the manual input operation for setting a third feature point in the input image after displaying of the input omission feature point candidate; and
extract, based on the third feature point, a fourth feature point from the input image.

4. The feature point input assisting device according to claim 3, wherein the processor is further configured to execute the instructions to:
input a terminating instruction for setting the third feature point; and output at least feature point data for specifying the second feature point when the terminating instruction is input.

5. The feature point input assisting device according to claim 1, wherein the processor is further configured to execute the instructions to:
apply a feature point mask, according to a type and a direction of the first feature point, to a position corresponding to the first feature point in the input image.

6. The feature point input assisting device according to claim 5, wherein the feature point mask is an image comprising a first pixel value that includes a region corresponding to a ridge line and a second pixel value that includes a region corresponding to a groove between ridge lines.

7. The feature point input assisting device according to claim 5, wherein the processor is further configured to execute the instructions to:
determine, based on the first feature point direction, a direction of a ridge line included in a region of a predetermined range having the first feature point.

8. The feature point input assisting device according to claim 7, wherein the processor is further configured to execute the instructions to:
match a direction of the ridge line included in a region of the predetermined range, the region being a first region having the first feature point, with the first feature point direction; and
extract, based on the first feature point direction, a direction of the ridge line included in a region of the predetermined range, the region being a second region not including the first region.

9. The feature point input assisting device according to claim 7, the processor is further configured to execute the instructions to:
emphasize the ridge line of the input image based on the first feature point direction.

10. The feature point input assisting device according to claim 9, wherein the processor is further configured to execute the instructions to:
thin the ridge line of the input image in which the ridge line is emphasized;
correct the thinned ridge line;
couple opposing end points; and
uncouple the opposing end points if at least one of the opposing end points is the first feature point.

11. The feature point input assisting device according to claim 1, wherein the processor is further configured to execute the instructions to:
delete the first or the second feature point from the input image; and
apply a feature point deleting mask on a position corresponding to the first or the second feature point to be deleted, the feature point deleting mask being defined according to at least a direction of a ridge line and an interval between ridge lines.

12. The feature point input assisting device according to claim 1, wherein the processor is further configured to execute the instructions to:
compare positions of the first and the second feature points in the input image;
compare a feature point direction of the first and the second feature points; and
determine, based on a predetermined range, whether the first feature point and the second feature point form a pair.

13. A feature point input assisting method, the method comprising the following operations performed by a processor:
receiving a manual input operation for setting a first feature point in an input image including a fingerprint image;
extracting, based on the first feature point, a second feature point from the input image;
extracting, based on a determination that the first feature point and the second feature point are not a pair, the second feature point as an input omission feature point candidate; and
displaying the input omission feature point candidate on the input image.

14. A non-transitory computer-readable medium storing instructions that, when executed by a processor of a computer, cause the processor to perform the following operations:
receiving a manual input operation for setting a first feature point in an input image including a fingerprint image;
extracting, based on the first feature point, a second feature point from the input image;
extracting, based on a determination that the first feature point and the second feature point are not a pair, the second feature point as an input omission feature point candidate; and
displaying the input omission feature point candidate on the input image.

* * * * *